United States Patent [19]

Baggarly et al.

[11] Patent Number: 4,639,873

[45] Date of Patent: Jan. 27, 1987

[54] INSERTION MACHINE WITH POSTAGE CATEGORIZATION AND SELECTIVE MERCHANDISING

[75] Inventors: Brad A. Baggarly, Upland, Calif.; Christopher K. Scullion, Bethlehem, Pa.

[73] Assignee: Bell & Howell Company, Chicago, Ill.

[21] Appl. No.: 818,389

[22] Filed: Jan. 13, 1986

Related U.S. Application Data

[63] Continuation of Ser. No. 576,839, Feb. 3, 1984, abandoned.

[51] Int. Cl.⁴ .................... B65H 39/075; B65B 35/50; G06F 15/20

[52] U.S. Cl. ...................................... 364/466; 53/154; 270/58; 364/478

[58] Field of Search ............... 53/154, 266 A; 270/54, 270/55, 58; 177/25, 50; 364/466, 478, 567

[56] References Cited

U.S. PATENT DOCUMENTS

| | | | |
|---|---|---|---|
| 2,325,455 | 7/1943 | Williams | 270/54 X |
| 3,260,517 | 7/1966 | Sather | 270/58 |
| 3,570,840 | 3/1971 | Sather et al. | 270/58 |
| 3,606,728 | 9/1971 | Sather et al. | 53/54 |
| 3,652,078 | 3/1972 | Sather et al. | 270/58 |
| 4,034,973 | 7/1977 | Hams | 270/58 X |
| 4,077,181 | 3/1978 | Asher et al. | 53/78 |
| 4,167,476 | 9/1979 | Jackson | 209/3.3 |
| 4,225,926 | 9/1980 | Wendt | 364/567 X |
| 4,280,179 | 7/1981 | Jones, Jr. et al. | 364/464 |
| 4,319,328 | 3/1982 | Eggert | 364/466 |
| 4,341,274 | 7/1982 | Hirano et al. | 177/25 |
| 4,500,083 | 2/1985 | Wong | 270/54 |

*Primary Examiner*—Errol A. Krass
*Assistant Examiner*—Edward R. Cosimano
*Attorney, Agent, or Firm*—Griffin, Branigan, & Butler

[57] ABSTRACT

In an insertion machine a track 20 moves groups of items past feed stations 31, 32, 33, 34, 35, 36, 37, 38, 39, during respective machine cycles. The feed stations selectively feed items onto the track 20 for inclusion with a group of items and eventual stuffing into an envelope to which postage need be applied. A master control item 46 fed from station 31 for each group has an indicia 50 thereon which provides an indication from which of the feed stations items can be fed. In order for data processing means 102 to calculate the amount of postage appropriate for the stuffed envelope, an operator uses a keyboard and display 110 to input predetermined per item weight values for items held at select stations. A data processor 102 uses the predetermined values indicative of the per item weight of items held in the stations to obtain a calculated total weight for each group of items. Some of the feed stations contain optional items which are to be selectively included with a group of items if the data processor 102 determines that the inclusion does not increase the postage amount for the group.

20 Claims, 11 Drawing Figures

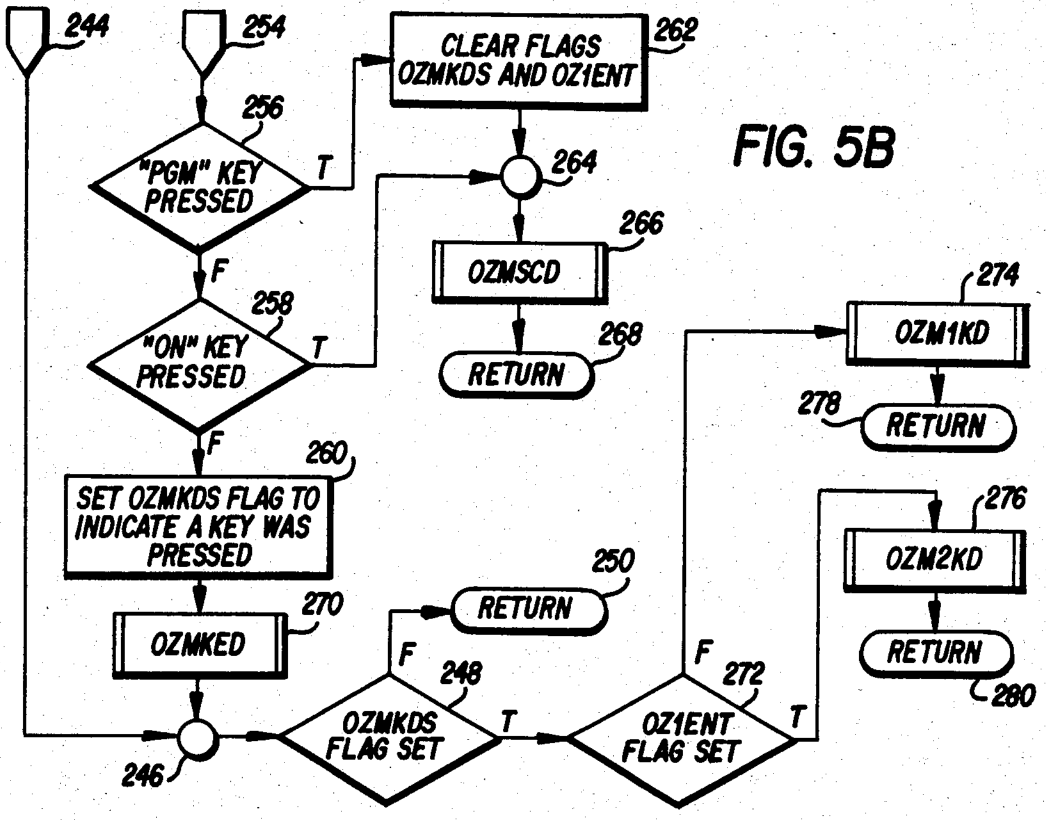
FIG. 5B
FIG. 2
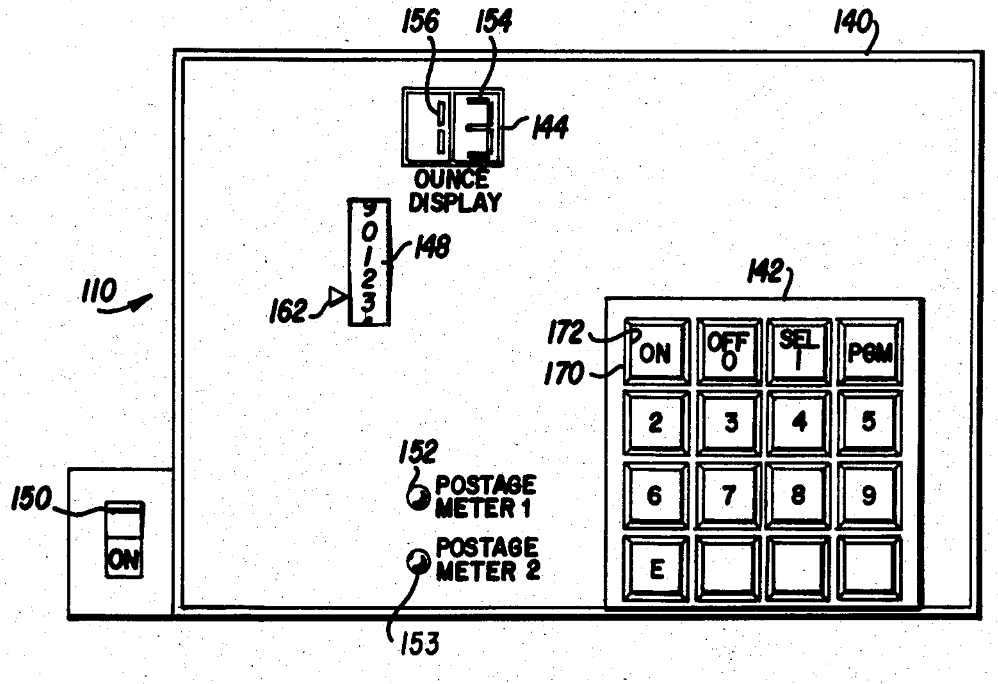

INSERTION MACHINE WITH POSTAGE CATEGORIZATION AND SELECTIVE MERCHANDISING

BACKGROUND

This is a continuation of application Ser. No. 576,839, filed Feb. 3, 1984, now abandoned.

A microfiche appendix comprising one fiche having 26 frames is included in the patented file.

This invention relates to an improved multi-station insertion machine and to a method of operating the same.

U.S. Pat. Nos. 2,325,455 and 3,260,517 relate to multi-station inserters which are presently produced and marketed by the assignee of the present application and well-known in the market as the Phillipsburg inserters. In the insertion machines of these patents a master control document is withdrawn from a master control document station and moved onto an inserter track which has a suitable conveyor means for moving the master control document past a plurality of insertion stations. As the master control document is thusly moved, additional documents from the insertion stations are stacked with the master control document. The master control document and its insertions are then inserted into a mailing envelope by well-known means.

U.S. Pat. No. 3,260,517 is particularly directed to an improvement of U.S. Pat. No. 2,325,455 and related to a device for deriving signals from particular master control documents and using those signals to control the subsequent selective insertion of documents from only selected insertion stations.

Once the control document and its insertions have been inserted into the mailing envelope, a determination must be made regarding the amount of postage to be applied to the envelope. However, insertion machines of the type described above are utilized in many environments in which it is difficult to make an accurate determination of the correct postage for each envelope.

As an example of this difficulty, in the telephone and credit card industries envelopes are mailed monthly to customers and include such enclosures as one or more sheets comprising a statement of account, informational enclosures, and advertising literature. With respect to informational enclosures, the sender may send certain general interest enclosures to all customers while also enclosing one or more of many special interest enclosures to select or targeted customers in accordance with the sender's estimation of the pertinence of the enclosure relative to each customer. Therefore, the weight of the envelopes can vary considerably from customer to customer depending on, for example, the number of sheets included in the statement of account and the number of items such as informational enclosures and advertising enclosures which are inserted in a customer's envelope.

While the statement of account and, in some instances, the general interest and special interest informational enclosures, are high priority "required" items for inclusion in a customer's envelope, the advertising literature is less significant and not deserving of inclusion in the envelope if the inclusion significantly increases the weight of the envelope and thus incurs additional postage.

Hence, an object of the present invention is the provision of an inserter machine which accurately determines the weight of an envelope and its associated required inserts.

An advantage of the present invention is the provision of an inserter machine which, by accurate determination of the weight of an envelope and its associated required inserts, results in a substantial financial savings.

A further advantage of the present invention is the provision of an inserter machine which is easily operated for determining the accurate weight of an envelope and its associated required contents.

Yet another advantage of the present invention is the provision of an inserter machine which includes optional advertising inserts for stuffing with a customer's envelope if and only if the additional weight of the inserts does not increase the postage amount required by the stuffed envelope.

Still another advantage of the present invention is the provision of an inserter machine which includes the maximum possible number of optional advertising inserts for stuffing with a customer's envelope without increasing the postage amount required by the stuffed envelope.

SUMMARY

In an insertion machine a first insert station feeds one or more sheets for a customer onto a conveyor. The first document fed from the first insert station functions as a master control document in that an indicia thereon indicates which of the insert stations further downstream have inserts which are pertinent to the customer. It is required that documents be fed from certain ones of the selected downstream insert stations, and that the weight of the required inserts and envelope of the customer be summed so that a postage categorization range can be determined. Third-party advertising documents are fed from one or more of other downstream insert stations if the indicia on the master control document so authorizes and if and only if the additional weight occasioned by the feeding of the advertising documents would not cause an increase in the postage for the customer's stuffed envelope. The number of third party advertising documents fed from each station is counted. An indication of the count is provided so that each third party can be billed by the sender for the number of advertisements mailed.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 2 is a front view of a keyboard and display panel of an insertion machine of an embodiment of the invention;

FIGS. 5A and 5B are diagrams depicting processing steps executed by a specialized routine OZM;

DETAILED DESCRIPTION OF THE DRAWINGS

Figures 1, 6:
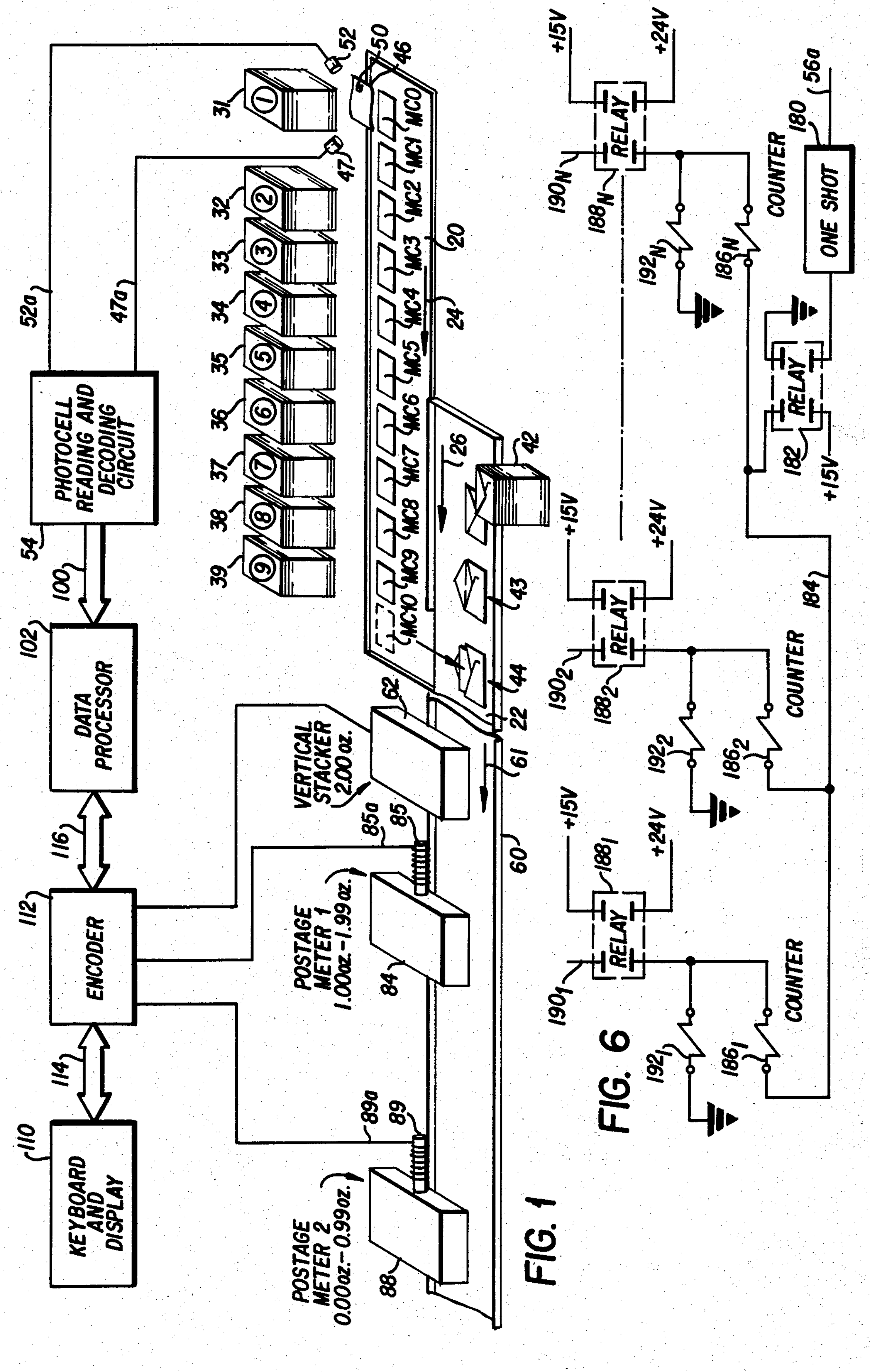
FIG. 1 is a schematic view of an insertion machine according to an embodiment of the invention.
FIG. 6 is a schematic view of circuitry for activating a plurality of insert station counters according to another embodiment of the invention.

FIG. 1 shows two parallel feed tracks or conveyors 20 and 22 which run parallel to one another in the direction of respective arrows 24 and 26. The first conveyor 20 travels past nine consecutive insertion stations 31, 32, 33, 34, 35, 36, 37, 38, and 39. In the embodiment shown, conveyors 20 and 22 are intermittently driven by a chain and sprocket arrangement so that the conveyors travel generally in the direction shown by the respective arrows 24 and 26. That is, during successive machine cycles a document on conveyor 20 travels in a leftward direction so that during the machine cycle MC2 the document is proximate the station 32; in the machine cycle MC3 the document is proximate the station 33, and so forth.

An envelope station 42 is positioned above and alongside conveyor 22 for discharging envelopes from a hopper of station 42 onto the conveyor 22. The conveyor 22 is indexed and station 42 is operated in timed relationship with the conveyor 20 so that, if a given customer's master control document is deposited onto conveyor 20 at MC0, that customer's envelope will be deposited onto conveyor 22 at about MC8. At MC9 the customer's envelope is opened at an envelope flap opening station generally pointed to by arrow 43. At MC10 the customer's documents, which have been cumulatively piled on top of one another as the documents travel down the conveyor 20, are stuffed into the opened envelope at a stuffing station (generally pointed to by arrow 44). While the structural and operational details of the envelope flap opening station and the envelope stuffing station are not specifically discussed herein, the same are understandable by the man skilled in the art, especially in view of the aforementioned Williams patent.

The first station (station 31) comprises a fast feeder for feeding one or more documents (also referred to as "sheets") per machine cycle onto the conveyor 20. A counter photocell 47 positioned proximate the first station 31 counts the number of documents fed from the fast feeder for each machine cycle. The documents fed by the feeder of station 31 during a given machine cycle are all associated with a particular customer. In the illustrated embodiment, the documents fed from station 31 are sheets included with a customer's bill or statement of account. In one mode (the "select" mode) the first document fed from station 30 with respect to each customer functions as a control document which to sone extent governs downstream operations as seen hereinafter. In a simplified mode the document fed from station 31 does not govern downstream operations. FIG. 1 shows a control document 46 in the process of being fed from the sheet feeder (SF) station 31 and being deposited on conveyor 20 during the machine cycle MC0.

In the select mode the control document 46 bears an indicia in a field 50. The marks in field 50 comprise control and count indicia which are read in conventional manner by photocell reading means 52 positioned in proximity to station 31. Photocell reading means 52 is electrically connected by connector 52*a* to a photocell reading and decoding circuit 54. In the embodiment shown in FIG. 1, the photocell reading means 52 is operative with the circuit 54 to function as a conventional reflective-type reading system particularly adapted to read a bar code. The counter photocell 47 is electrically connected by connector 47*a* to the circuit 54. The circuit 54 is adapted to interpret the bar code in indicia field 50 and to interpret the number of documents counted by photocell 47, as well as to appropriately express and transmit the interpreted data via a data bus to data processing means.

In the select mode the indicia field 50 borne by the master document 46 indicates from which of the subsequent stations documents are to be fed during a corresponding machine cycle (i.e. if appropriate inserts are to be selectively fed from the second insert station 32 during the machine cycle MC2, from the third insert station 33 during the machine cycle MC3, and so forth). Alternatively, in a simplified or automatic mode the insertion machine can be set up so that one insert is automatically fed from each insertion station for each customer.

Each of the stations 32–39 comprises suitable gripper means (not shown) for retrieving from the bottom of the stack in the hopper of the station during a corresponding machine cycle the one or more documents associated with a given customer. In this regard, the means for removing documents from the hopper of these stations is, in one embodiment, that disclosed in U.S. Pat. No. 2,325,455 to Williams (incorporated herein by reference), although it should be understood that other types of means for extracting documents from these stations and for depositing the same on conveyor 20 may be employed.

The second document feeding station 32 comprises means for feeding one or more documents therefrom onto document 46 when document 46 is in a position on the conveyor 20 shown as MC2. In the embodiment shown in FIG. 1, the feeding means of station 32 feeds cards such as punched computer cards which the customer is required to return along with payment of his bill. It is to be noted that stations 31 and 32 are spaced apart by a segment of track 20 in which documents are positioned for machine cycle MC1.

In the embodiment illustrated in FIG. 1, insert stations 33, 34, and 35 contain general interest and/or special interest informational enclosures which the sender may wish to selectively include in the stuffed envelope containing the customer's bill. For example, station 33 may contain an enclosure which is to be sent only to customers whose bill is overdue; station 34 may contain an enclosure which may announce a future additional service to be provided by the sender; station 35 may contain an enclosure targeted to special customers such as the elderly, for example. In the select mode the indicia 50 on a customer's control document 46 indicates whether inserts are to be fed from one or more of the stations 33, 34, and 35 for the customer. In this respect, the indicia 50 on control document 46 requires that the inserts from these selected stations be included with the sheets comprising the customer's bill (fed from station 31) and the billing card (fed from station 32) in the customer's stuffed envelope. As seen hereinafter, the total weight of the envelope, billing sheets, billing card, and other required inserts is calculated so that a projected postage categorization range can be determined for the customer's envelope once it is stuffed.

In the example described above the sender has not utilized insert stations 36, 37, 38, and 39 for his own purposes. Rather than let all these stations remain idle, the sender has placed in stations 36 and 37 advertising inserts for two third parties. For example, in station 36 the sender has placed advertising inserts for a magazine publisher; in station 37 the sender has placed advertising inserts for a phonograph club promoter. The sender has agreed to include one or both of the advertising inserts in stuffed envelopes for each of the sender's customers if and only if the additional weight of the optional advertising inserts will not cause the customer's stuffed envelope to incur postage in addition to the amount determined for the already projected postage categorization range. In this respect, if the indicia 50 on the customer's master control document 46 authorizes the inclusion of third party advertising inserts for the optional stations 36 and 37, and if advertising inserts from station 36 and/or station 37 can be included without increasing the weight of the stuffed envelope into the next highest postage categorization range, one or more advertising inserts will be included in the customer's stuffed envelope. The sender determines the number of advertising inserts fed on behalf of each third party and charges the third party a per insert fee for the sender's service. The determination is facilitated by counters operated in conjunction with each of the optional insert stations. In the illustrated embodiment, insert station 36 is provided with an associated digital counter 55 and a one-shot multivibrator 56. Likewise, insert station 37 is provided with an associated digital counter 57 and a one-shot multivibrator 58 (FIG. 3).

A downstream portion 60 of the conveyor 22 generally travels in the direction of arrow 61 (which is essentially parallel to the direction of arrow 26). Although not specifically shown in FIG. 1, it should be understood that in accordance with differing embodiments numerous other stations are proximate the conveyor and upstream from portion 60 thereof. Examples of unillustrated intermediate stations include a sealing station (where a selectively operable sealing actuator seals envelopes), and one or more vertical stacking stations such as an error stacker station of a type which comprises stacking fingers to grasp documents and hold the grasped documents above the conveyor 20.

Figure 3:
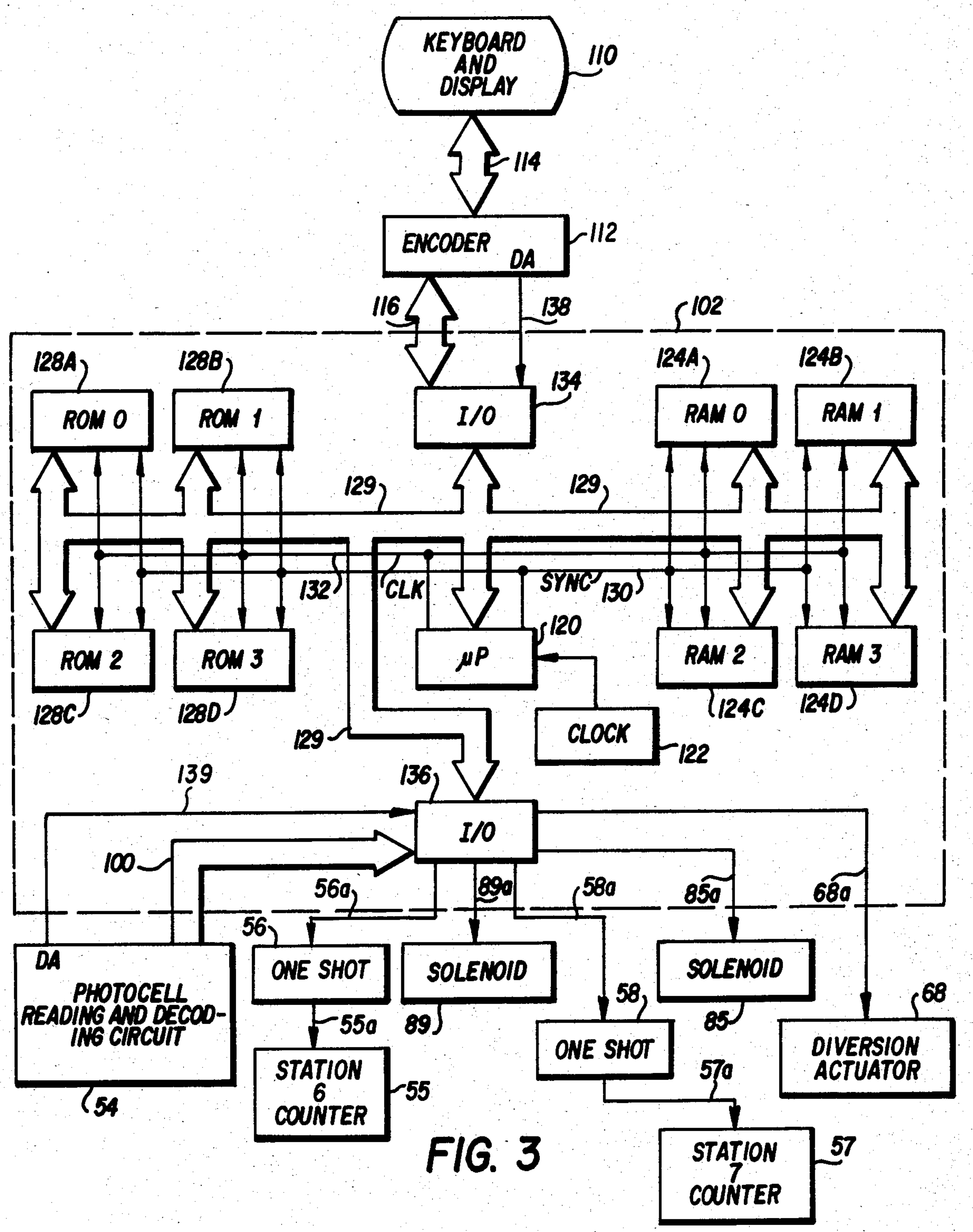
FIG. 3 is a schematic view showing components included in data processing means which comprise an insertion machine according to an embodiment of the invention.

The downstream portion 60 of conveyor 20 comprises diversion means 62 which is selectively actuated by actuation means 68 FIG. 3. In the illustrated embodiment of FIG. 1 the diversion means 62 comprises a vertical stacker which includes fingers which, when actuated, lift an envelope from the plane of the conveyor 60 into a vertical hopper. Examples of diversion stackers are shown in U.S. Pat. No. 3,652,828 to Sather et al., which is incorporated herein by reference. It should be understood, however, that in other embodiments other types of diversion means are employed. For example, in one embodiment the diversion means comprises a divert gate which, when actuated, deflects a travelling envelope onto a transversely-oriented conveyor. For purposes of the current illustration, stuffed envelopes weighing 2.00 ounces or more are classified as "overweight" and are diverted by diversion means 62.

A first postage meter 84 is positioned proximate the conveyor portion 60 in essentially in-line fashion for selectively applying an appropriate amount of postage to certain ones of stuffed envelopes travelling down the conveyor portion 60. In the illustrated embodiment, the first postage meter 84 is preset to apply appropriate postage to a stuffed envelope weighing in the range from 1.00 ounces to 1.99 ounces. The first postage meter 84 is activated by a solenoid 85 to apply postage to a stuffed envelope travelling proximate thereto on conveyor portion 60.

A second postage meter 88 is positioned proximate the conveyor portion 60, also in essentially in-line fashion but downstream from the first postage meter 84. Postage meter 88 selectively applies an appropriate amount of postage to certain others of stuffed envelopes travelling down the conveyor portion 60. In the illustrated embodiment, the second postage meter 88 is preset to apply postage to a stuffed envelope weighing in the range from 0.00 ounce to 0.99 ounce. The second postage meter 88 is activated by a solenoid 89 to apply postage to envelopes passing proximate thereby on conveyor portion 60.

From the foregoing it is seen that three weight classifications have been established with respect to the illustrated mode of FIG. 1: an overweight classification (2.00 ounces and greater); a top range classification (1.00 ounces to 1.99 ounces); and, a low range classification (0.00 ounces to 0.99 ounces).

It is to be understood that further processing, such as zip code sorting, for example, takes place in unillustrated stations upstream from conveyor portion 60.

FIG. 1 further shows a keyboard and display panel 110 interfacing with an encoder 112 through a four bit bi-directional data bus 114. Encoder 112 in turn communicates with the data processor 102 through a four bit bi-directional data bus 116.

The data processing means 102 is shown in FIG. 3 as comprising a microprocessor 120; a clock 122 used by the microprocessor 120 for timing purposes; four RAM chips 124A, 124B, 124C, and 124D; and, four ROM chips 128A, 128B, 128C, and 128D. A four bit bi-directional data bus 129 connects data pins of the microprocessor 120 to data pins of each of the RAMs 124 and to data pins of each of the ROMs 128. Lines for the RAM bank select signals and ROM bank select signals are not expressly shown inasmuch as their usage will be apparent to those skilled in the art. Line 130 carries a synchronization signal generated by the microprocessor 120 and sent to the RAM chips 124 and the ROM chips 128. Line 132 carries clock signals in a conventional manner. Input/output chips 134 and 136 are also connected to the microprocessor chip 120 through the data bus 129. I/O chip 134 interfaces with the encoder through bus 116 and data available line 138. I/O chip 136 interfaces with the photocell reading and decoding circuit (through bus 100 and data available line 139); the solenoids/actuators 68, 85, and 89 (through respective lines 68*a*, 85*a*, and 89*a*); and counter 55 (through line 56*a*, one-shot 56, and line 55*a*) and counter 57 (through line 58*a*, one-shot 58, and line 57*a*).

In the illustrated embodiment, the microprocessor 120 of the data processing means 102 is a single chip, 4-bit parallel MOS central processor known as an INTEL 4040. The characteristics of the illustrated microprocessor 120, RAMs 124, ROMs 128, and I/O devices 134 and 136 are described in a publication entitled *INTEL MCS*-40 Users Manual, available from the Intel Corporation of Santa Clara, Calif. The instruction set summary provided at pages 1-19 through 1-33 of the March 1976 Third Edition of the referenced publication is used in connection with the processing routines discussed herein.

Referring now to FIG. 2, the keyboard and display 110 comprises a display console or panel 140 which comprises a keyboard 142; and "ounce display" indicator 144; and, a thumbwheel dial 148. Shown proximate the display panel 140 in an "on" position is an ounce set-up mode switch 150 which is manually actuated to accomplish the purposes hereinafter stated.

Panel 140 also includes postage meter activation indicators such as LEDs 152 and 153. Indicator 152 is associated with a first postage meter (i.e. postage meter 84) while indicator 153 is associated with a second postage meter (i.e. postage meter 88).

Ounce display indicator 144 has a hundredths digit display 154 comprising a first seven-segment LED display and a tenths digit display 156 comprising a second seven-segment LED display.

The thumbwheel dial 148 is a conventional thumbwheel dial which, for the purposes of this invention, includes the numerals 0 through 9 on its outer circumferential rim. The selected thumbwheel setting is indicated by a selector mark 162 on the panel 140.

The keyboard 142 comprises four rows of keys 170, each row having four keys therein. The first or uppermost row of keys includes a "ON" key, an "OFF" key, a "SEL" or select key, and a "PGM" or program key. The "OFF" and "SEL" keys also double as keys for the numerals "0" and "1" respectively. Row 2 of the keyboard 142 includes separate keys for each of the four numerals "2", "3", "4", and "5". Row 3 of the keyboard 142 includes four keys for the numerals "6", "7", "8", and "9". Row 4, or the lowermost row of the keyboard 142 includes a key labeled "E". The keys are appropriately labeled in the just-described format, each key 170 bearing an appropriate indicia thereon. Each key 170 has a translucent central portion 172 which overlays a light source, such as an LED, associated with the key.

FIG. 6 shows an alternate embodiment of circuitry used for activating a plurality of insert station counters. The circuitry of FIG. 6 is usefully employed when the I/O chip 136 cannot drive a one-shot multivibrator for each optional insert station as it does for stations 36 and 37 in the embodiment of FIG. 3. In the FIG. 6 embodiment, line 56*a* from I/O chip 136 is connected to a one-shot multivibrator 180 which (like one-shots 56 and 58 of the FIG. 3 embodiment) is a 50 microsecond one-shot. An output terminal of the one-shot 180 is connected to a first input terminal of a solid state relay (SSR) chip 182. A second terminal of the SSR 182 is connected to +15 volts while a third terminal of the SSR 182 is grounded. An output terminal of the SSR 182 is connected by a bus 184 to first terminals of a plurality of counters 186. In the embodiment of FIG. 6, counter $\mathbf{186_1}$ is associated with a first optional insert station; counter $\mathbf{186_2}$ is associated with a second optional insert station; and so forth. The second terminal of each counter 186 is connected to an output terminal of a corresponding solid state relay 188. For example, the second terminal of counter $\mathbf{186_1}$ is connected to solid state relay $\mathbf{188_1}$; the second terminal of counter $\mathbf{186_2}$ is connected to solid state relay $\mathbf{188_2}$; and so forth. Each counter 186 is of a type that is digitally incremented whenever a true signal is applied to its second terminal while its first terminal is grounded.

Each SSR 188 has a first terminal connected by a line 190 to the I/O chip 136; a second terminal connected to +15 volts; a third terminal connected to +24 volts; and, as mentioned above, a fourth terminal connected to the associated counter 186. Thus, chip 136 is connected to SSR $\mathbf{188_1}$ by line $\mathbf{190_1}$, to SSR $\mathbf{188_2}$ by line $\mathbf{190_2}$, and so forth. The fourth terminal of each SSR 188 is also connected to a second terminal of a vacuum solenoid 192, a first terminal of each solenoid 192 being connected to ground. The SSR $\mathbf{188_1}$ is thusly connected to solenoid $\mathbf{192_1}$; SSR $\mathbf{188_2}$ is thusly connected to solenoid $\mathbf{192_2}$; and so forth. Each solenoid 192 is of a type that is activated (and hence causes an insert to be deflected from the hopper of its associated insert station for feeding onto the conveyor 20) when a true signal is applied to its second terminal.

The operation of various embodiments of the insertion machine of the invention will now be described. The mode of operation under discussion generally concerns the reading of a control document from the sheet feeder station 31 in order to determine the stations from which inserts are to be fed and the number of inserts fed from each. The operation of a simplified mode wherein insert stations automatically feed inserts without governance by read parameters is also understood from the ensuing discussion.

The data processing means 102 executes numerous specialized routines in connection with the overall operation of the entire insertion machine. These numerous routines are, for the most part, called into execution by master routines, including a master routine SYS. These lengthy and complex master routines supervise execution of the specialized routines, many of which are relatively independent rather than interdependent. In this respect, most of the specialized routines called by the master routines concern process steps which do not form a part of the present invention such as, for just one example, the operation and timing of means used to extract inserts from each of the insert stations along the conveyor. For this reason, only the specialized routines pertinent to this invention are discussed herein. The interface between the pertinent specialized routines and the appropriate master routine (SYS) is sufficiently discussed herein without describing all the collateral aspects of the master routine.

Figure 7:
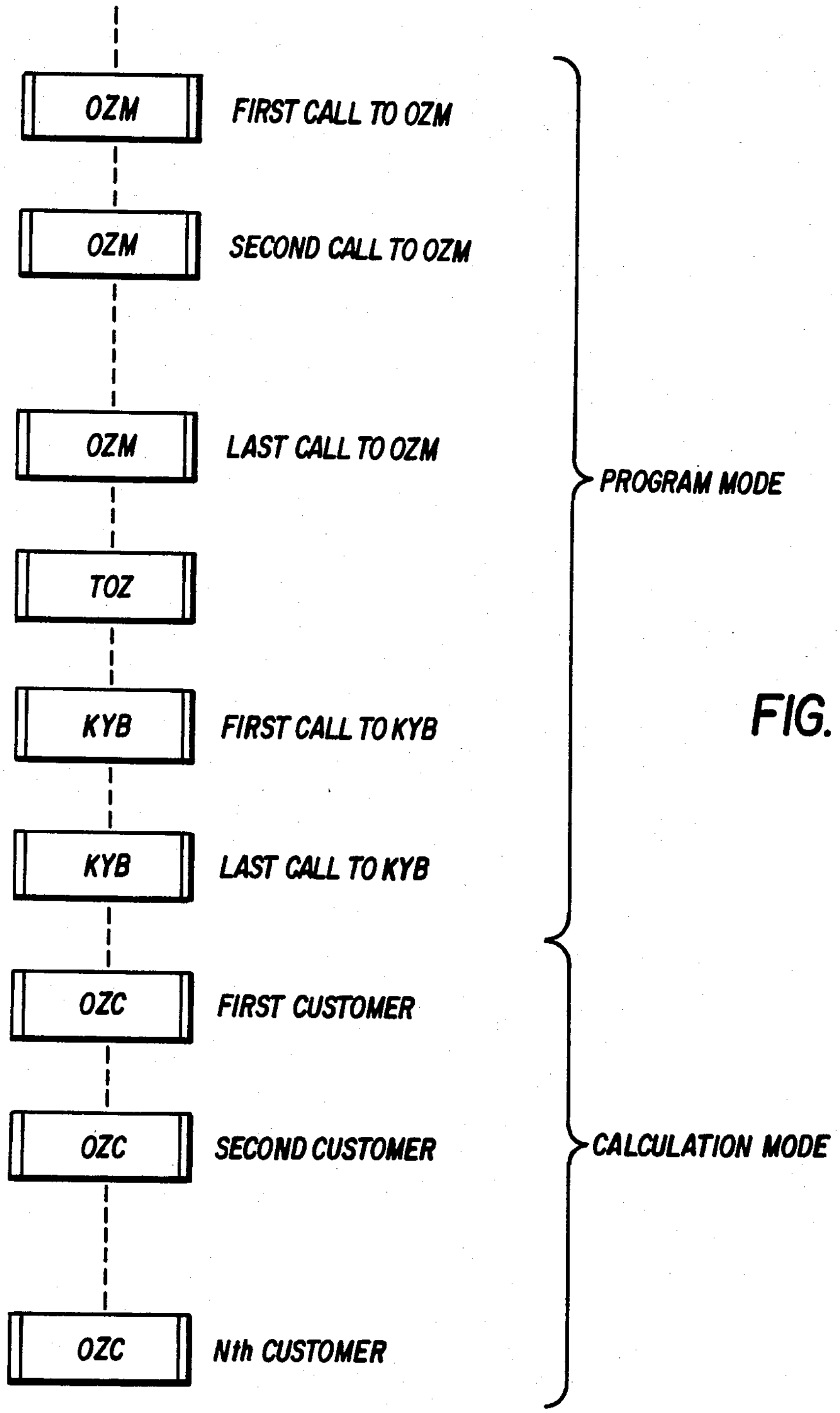
FIG. 7 is a diagram depicting a sequence in which a master routine calls various specialized routines; and, FIG. 8 is a diagram depicting processing steps executed by a specialized routine USM.

FIG. 7 illustrates the manner in which master routine SYS superintends processing of the various specialized routines which the data processing means 102 finds pertinent to the invention. It is to be understood that the specialized routines shown in FIG. 7 are included at intermediate processing sequence positions between start up and shut down of the insertion machine. The vertical arrangement of three dots between the routine blocks of FIG. 7 indicate that the specialized routines are not necessarily executed one after the other, but that calls to other specialized routines not pertinent to the invention may be interspersed in the sequence.

FIG. 7 shows that a program mode includes calls to routine OZM. The routine OZM, called when the PGM key on keyboard 142 is hit (PGM lamp lit) and switch 150 is turned "on", enables the operator to store in memory in the data processing means 102 data pertinent to the per item weight at selected insert stations and to display indications of the same on the panel 140. The routine OZM is called repeatedly until the switch 150 is manipulated to indicate that the set up mode is to be terminated (i.e. switch 150 is turned off) and the PGM key on keyboard 142 is pressed (PGM key lamp extinguished).

Sometime after the last call to routine OZM a call is made to the specialized routine TOZ. Routine TOZ basically transfers certain values at addresses in certain memory locations to other memory locations.

If the PGM key on keyboard 142 is again pressed (so that the PGM key lamp is lit) without the switch 150 having been turned on, calls are made to a routine KYB. Routine KYB enables the operator to manually enter on the keyboard 142 the desired status of each of the stations 32–39 and the envelope station 42. That is, for any station the operator can specify whether the station is to automatically feed inserts regardless of indicia markings, whether the station is to feed inserts depending on indicia markings, or whether the station turned off so that no inserts are fed under any condition.

After execution of the program mode routines is completed, and when documents are properly positioned in the stations 31–39, the processing along track 20 can commence. Master routine SYS makes a call to routine OZC, the Ounce Calculation routine, for each customer after the customer's master control document 46 has been read. In conjunction with its various associated routines the routine OZC computes the projected weight of the customer's stuffed envelope and determines how the stuffed envelope will be handled for postage purposes. In this latter regard, routine OZC in conjunction with routine OZS sets certain flags in memory depending on whether the stuffed envelope is overweight (hence to be diverted by stacker 62), is in the top postal-weight range (hence to be applied postage by meter 84), or is in the low-postal weight range (hence to be applied postage by meter 88).

PROGRAM MODE

When the operator desires to prepare the insertion machine to process a new batch of documents, such as telephone billing documents, for example, in the manner aforedescribed, the data processor 102 must be supplied with information relative to the per document weight of the documents at each of the stations 31, 32, 33, 34, 35, 36, 37, and 42. As seen hereinafter in connection with the OZC routine and related routines, this information is required in order for the data processor 102 (1) to compute the weight of each envelope (including its associated contents) traveling on the conveyor 20; (2) to determine whether optional inserts can be fed from either of the optional insert stations 36 and 37 without increasing the postage cost of the envelope; and, to (3) appropriately divert the envelope to stacker 62, or to activate in timely fashion either the first postage meter 84 or the second postage meter 88.

As seen hereinafter, the necessary per document weight for each insert station is input using a routine OZM which is called by the master routine SYS. To commence the set up procedure, and hence appropriate calls to the OZM routine, an operator must first manipulate the ounce mode set-up switch 150 to be in the "ON" position as shown in FIG. 2. Placing the switch 150 in the "ON" position sets a flag in an OZMDE address location which is checked by the routine SYS to determine whether one of the two criteria have been met for a call to OZM. Additionally, the operator must depress the PGM key on the keyboard 142. Once the switch 150 and the PGM key are activated, the SYS routine essentially remains in a closed loop of repeated calls to the routine OZM until the following two steps both occur: (1) the switch 150 is moved to the "OFF" position, and (2) the PGM key is again depressed.

ROUTINE OZM

Figure 5A:
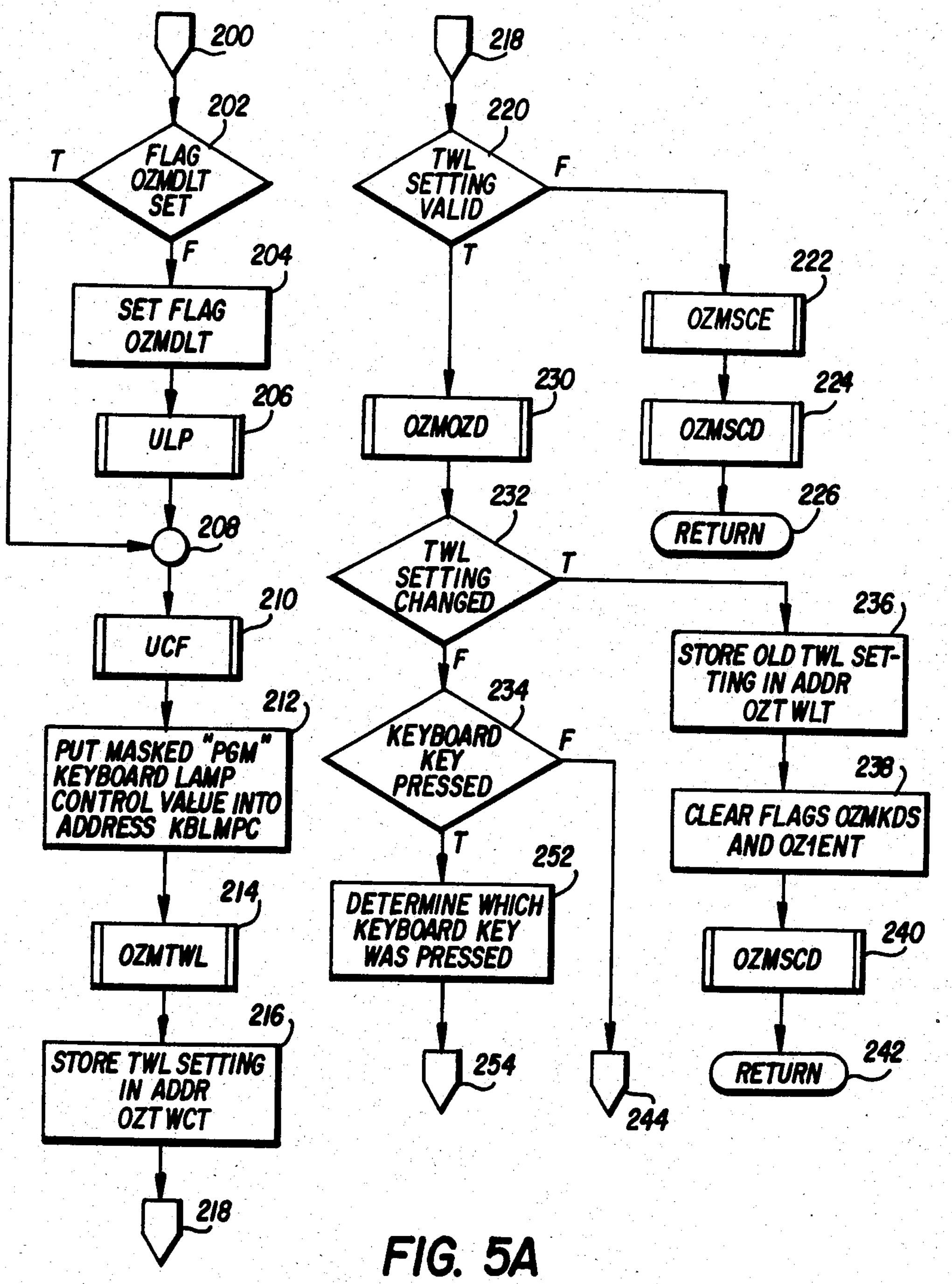

The procedure effected by the routine OZM is diagrammed in FIGS. 5A and 5B and herein referred to as the "set-up mode". The set-up mode is a subset of the program mode depicted in FIG. 7. A call to OZM transfers control to an instruction at address OZMFLP represented by the symbol 200 in FIG. 5A. The first step 202 performed in routine OZM is a check to determine whether the flag OZMDLT has been set. If the OZMDLT flag has not been previously set, it is so now (in step 204) and a call is made (step 206) to the utility routine ULP. In essence, the routine ULP clears all lights associated with the keys 170 on keyboard 142 inasmuch as some of the keys may have previously been lit. Upon return from the routine ULP the next instruction to be executed is at location OZMPT1 which is represented by symbol 208. If it is determined in step 202 that the OZMDLT flag has already been set, a jump is made to the instruction at location OZMPT1 (represented by symbol 208).

At location OZMPT1 a call is made to utility routine UCF (step 210). Routine UCF essentially prepares a mask that operates on a value in location PGMKLP so that the light associated with the PGM key will flash on and off. A call to the routine UCF basically increments a counter which determines the construction of the mask.

In step 212 the bit PGMKLP (which is indicative of the status of the lamp for the PGM key) is turned on and then masked with the mask returned from the routine UCF. The mask returned from the routine UCF may, depending on its construction (and thus the contents of the counter maintained by routine UCF), either leave the bit PGMKLP unmodified (and thus the lamp stays on) or may modify the bit PGMKLP (setting it equal to zero so that the lamp is turned off). Upon repeated calls to the routine OZM, and hence upon associated repeated calls to the utility routine UCF, the value of the counter in UCF changes so that upon a selected number of repeated calls the mask is altered to cause the value of the bit PGMKLP to essentially flip-flop. The value of the bit PGMKLP is applied on an output address KBLMPC to the keyboard 142 and the flip-flop nature of the contents of the PGMKLP bit causes the PGM key to flash on and off.

During each execution of the OZM routine a call is made to routine OZMTWL as shown in step 214. Execution of the OZMTWL routine causes the value selected on the thumbwheel 148 to be input from a location THUMBU. In step 216 after the return from routine OZMTWL, the value selected by the thumbwheel (hereinafter referred to as of TWL) is stored in an address OZTWCT.

Once the TWL setting for thumbwheel 148 has been determined, a check is made (step 220) to determine whether the selected value of TWL is valid. That is, a check is made to determine whether the selected value is within an acceptable range. The accepted values include the numerical settings 0, 1, 2, 3, 4, 5, 6, 7, 8, and 9. Each of these acceptable settings correspond with one of the stations (stations 42, 31, 32, 33, 34, 35, 36, 37, 38, and 39) shown in FIG. 1. For example, TWL=0 corresponds to the envelope station 42. TWL=1 concerns the faster feeder station 31; TWL=2 concerns the second station 32; and so forth.

In the event the value of TWL is determined to be invalid, a call is made (step 222) to a routine OZMSCE. The routine OZMSCE essentially makes preparations so that the value "00" will be displayed at the ounce display indicator 144 on panel 140. In order to display the value "00" on panel 140 the routine OZMSCE calls a routine ROD.

Upon return from the routine OZMSCE, a call is made in step 224 to the routine OZMSCD which clears (turns off) the lamps associated with the keys 170 on the keyboard 142. Upon return from the subroutine OZMSCD, processing returns from the routine OZM to the routine SYS as indicated by the symbol 226. As indicated above, unless both the switch 150 and the key PGM are turned off, the routine SYS will again call the routine OZM. Unless a valid TWL setting has been selected prior to step 220 of the next execution of routine OZM, the steps described above will again be repeated. It should be understood that the repeated execution of routine OZM causes the various lamps associated with the keyboard 142 to flash on and off in the manner described above.

In the event that the TWL setting has been determined to be valid, a routine OZMOZD (step 230) is called in order to display on display indicator 144 the current per document weight information associated with the station reflected by the TWL setting. The routine OZMOZD calls a routine OZMATD which fetches from an address contained in Register Pair 0 (hereinafter Register Pair is abbreviated RP) a value which is put into RP 4. In this respect, routine OZMATD constructs the address placed into RP 0 essentially by adding the value TWL (stored in location OZTWCT) to the address of the first word ENOZTN of a table at location OZMATL. In this respect, the word ENOZTN is an address wherein is stored a value indicative of the tenths digit of the per document weight for the envelope station (the station 42). Successive words in the table OZMATL generally correspond to address locations for tenths digit weight values for station 31 and successive stations. Hence, the table OZMATL is constructed to have the addresses of the following ten words:

Word 0—EN0ZTN
Word 1—HF0ZTN
Word 2—S20ZTN
Word 3—S30ZTN
Word 4—S40ZTN
Word 5—S50ZTN
Word 6—S60ZTN
Word 7—S70ZTN
Word 8—S80ZTN
Word 9—S90ZTN Thus, for the setting "2" on the thumbwheel 148, routine OZMATD constructs the address S20ZTN. Routine OZMATD further fetches data at the address S20ZTN and puts the same into RP 4,5 before returning to the routine OZMOZD.

Upon the return from routine OZMATD, the routine OZMOZD puts the current tenths ounce value into index register (hereinafter abbreviated as "XR") 8 and computes the address from which the current hundredths ounce value can be fetched for the currently selected station. In this respect, the address at which a hundredths ounce value for a particular station is stored is just one word greater than the address at which the tenths value was stored for the same station. With reference to the second insert station 32, for example, in order to obtain the hundredths value for station 32 the routine OZMOZD determines that the appropriate value is located at the address S20ZTN+1=S20ZHU. The routine OZMOZD fetches the value at address S20ZHU and puts the same in XR 9. Then, having put the value at address S20ZTN into XR 8 and the value at address S20ZHU into XR 9, the routine OZMOZD calls the readout display routine ROD.

Once the per document weight information has been displayed at indicator 144 for the currently selected station, the routine OZM determines whether the setting TWL of the thumbwheel 148 is the same for the current execution of routine OZM as it was during the next previous execution. In particular, at step 232 the routine OZM determines whether the value stored in location OZTWCT (the current TWL setting) is the same as that already stored in location OZTWLT (the setting of the thumbwheel 148 during the next previous execution of the routine OZM). Unless the operator has changed the setting of thumbwheel 148 since the last execution of the routine OZM, the values in location OZTWCT and OZTWLT will be equal and the routine OZM will execute step 234 as described later herein.

Suppose, for example, the thumbwheel 148 had been set to "0" on the next previous execution of the routine OZM in connection with the setting up of data for the envelope feeder station 42 but has just been changed to "3". The value stored in OZTWLT is "0"; the value stored in OZTWCT is "3" assuming TWL setting 3 for insert station 33 has just been selected. When the operator changed the setting on thumbwheel 148 in order to input new per document weight data for a new station, the routine OZM executed step 236 to store the old TWL value into the address OZTWLT. Storage of the former TWL value is required so that the determination of step 232 can be made during the subsequent execution of the routine OZM.

In addition to storing the old TWL value when a new TWL setting has been selected on the thumbwheel 148, the routine OZM executes step 238 to clear the flags OZMKDS and OZ1ENT. Having cleared these flags, routine OZM calls the routine OZMSCD (step 240), which at this point clears appropriate addresses so that any keys previously lit on the keyboard 142 are turned off.

Following the execution of steps 236, 238, 240 described above, processing returns from the routine OZM to the routine SYS as indicated by the symbol 242. However, as mentioned before, unless the switch 150 is turned to the "OFF" position and the key PGM again depressed, the routine SYS immediately recalls the routine OZM. During this recall of OZM, the new TWL value is put into the address OZTWCT at step 216 following the call at step 214 to routine OZMTWL. Also during this call to routine OZM, should the new TWL setting be valid the routine OZMOZD (step 230) causes the currently programmed ounce weight information associated with the newly selected station to be displayed at indicator 144. At this point the routine OZM performs the check of step 232 and, assuming the value of TWL has not again been changed, determines that the thumbwheel setting TWL has not been changed since the last execution of routine OZM. If such a determination is made, the routine OZM branches to step 234.

At step 234 the routine OZM inquires whether new data is available from the keyboard 142. In this respect, the encoder 112 has a pin DA which is false if data is not available from the keyboard 142 but which is true if data is available. Based on this signal from the encoder 112, the data processor 102 sets an input flag DATAVL if data is available. The routine OZM expects data from the keyboard 142 at this juncture inasmuch the next regular mode of operation would be to select keys representing new information for the per document ounce weight for the station code currently of interest. If a key 170 on keyboard 142 has not been depressed, the routine OZM branches to location OZMT7 represented by symbol 246. Further, since a key 170 has not been pressed and since the flag OZMKDS has not been set after being cleared in step 238, the routine OZM notes at step 248 that the flag OZMKDS has not been set and returns processing to the routine SYS as indicated by symbol 250. Given the speed with which the routines are executed and the operator's relative slowness in selecting a key 170 on the keyboard 142, it can be expected that numerous calls to the routine OZM are made before a new key 170 is selected.

Once a key 170 on the keyboard 142 has been selected, however, and the routine OZM notes that fact in step 234 by perceiving that the input DATAVL has been set, the routine OZM executes step 252 to determine which key on the keyboard 142 was depressed. In this respect, data representative of the depressed key is acquired through input address KBDLOW. Inasmuch as two of the keys on the keyboard 142 do not correspond to numerical inputs—the ON key and the PGM key—it would not ordinarily be expected that they would be depressed at this juncture. In this regard, the routine OZM checks the value of KBDLOW at step 256 to determine whether the PGM key was depressed. If the PGM key was not depressed, routine OZM further checks at step 258 to determine whether the ON key was improperly pressed. If neither the PGM key or the ON key were depressed, the routine OZM sets a flag OZMKDS (step 260) to indicate that a valid key on the keyboard 142 was pressed. If the "ON" key was pressed, processing jumps to a location represented by symbol 264.

Considering briefly the possibility that the PGM key may have been pressed by the operator, in such case the routine OZM branches to a step 262 where it clears both the OZMKDS and the OZ1ENT flags. Then, at location OZMTX (represented by symbol 264), the routine OZMSCD is called (step 266). At this juncture the routine OZMSCD functions to turn off any of the lamps associated with the keys on the keyboard 142. After the call to routine OZMSCD, the routine OZM returns processing to the routine SYS as represented by symbol 268.

When a valid key has been pressed on the keyboard 142 the flag OZMKDS is set as described in step 260 above. Following the setting of the OZMKDS flag, a call is made (step 270) to routine OZMKED. Routine OZMKED basically functions to extinguish all the lamps associated with the keyboard 142 except the lamp associated with the PGM key and the lamp associated with the key just depressed. In order to activate a lamp associated with the key just depressed, the routine OZMKED calls a further routine OZMDEL which uses a look-up table OZMDET to determine an appropriate output address which corresponds to the particular key selected. The selection of the appropriate address in the table OZMDET is based upon the value contained in the address KBDLOW which, as indicated above, is indicative of the particular key pressed.

Upon return from the routine OZMKED, the routine OZM checks (step 248) to determine whether the OZMKDS flag has been set. Assuming a valid key on keyboard 142 was pressed, the OZMKDS flag has in fact been set (see step 260) so that the routine OZM next jumps to step 272 where it inquires whether the flag OZIENT has been previously set. According to specification, the key just depressed represents to the operator the desired tenths ounce digit which the operator expects to see in digit 156 of indicator 144 for the station selected by the thumbwheel 148. Having already pressed a key for the tenths ounce digit, the next key which the operator will eventually press will represent the desired value for the hundredths ounce digit to be displayed in digit 154 of the indicator 144 with respect to the station of current interest. Thus, for any given station, the first valid key selected on keyboard 142 corresponds to the tenths ounce digit and the second valid key selected corresponds to the hundredths ounce digit. In this respect, the flag OZIENT is used to determine when the key just selected on the keyboard 142 was the first entry (tenths digit) or the second entry (hundredths digit) of an ordered pair of entries for the station selected by the setting of thumbwheel 148.

In the above regard, if the OZIENT flag has not yet been set, the routine OZM calls routine OZM1KD (step 274) which processes the new entry for the tenths ounce digit. In its execution, routine OZM1KD first sets the flag OZIENT so that upon the next execution of routine OZM after step 272 the routine OZM will branch to step 276 to call the routine OZM2KD rather than repeat the call to routine OZM1KD.

After setting the flag OZIENT, the routine OZM1KD calls the routine OZMOKT in order to determine what key on the keyboard 142 was in fact selected. The routine OZMOKT performs a table look-up to determine for eventual display purposes a two word decimal equivalent for the key selected on keyboard 142. In performing the look-up, a table OZTLB is referenced. In this respect, the routine OZMOKD computes an address in the table OZTBL whose contents is the desired two word decimal equivalent. The contents of the selected address of the table is loaded into RP 8.

After having called the routine OZMOKT, the routine OZM1KD calls the routine OZMATD in order to select the proper address into which the converted decimal value in RP 8 is to be loaded. It will be recalled that the proper address is dependent upon the particular station currently selected at the thumbwheel 148. Thus, based upon the TWL code (stored at the location OZTWLT) the routine OZMATD computes a value corresponding to an address in its table OZMATL, the computed address having as its contents the address into which the two word decimal conversion equivalent of the most recently selected key is to be stored. Thus, with reference to the table OZTBL of routine OZMOKT and a table OZMATL of the routine OZMATD, if the routine OZM1KD is processing data which indicates that the key for the number "1" was most recently selected on the keyboard 142, the routine OZMATD would store a "1" at the location S30ZTN.

Following a call to routine OZMATD, the routine OZM1KD calls at step 274 a utility routine UDL which essentially serves as a time delay for keeping the lamp associated with the most recently selected key on keyboard 142 lit. After the call to utility routine UDL, routine OZM1KD calls routine OZMSCD to clear (deactivate) all the lamps associated with the keys on keyboard 142. The routine OZMSCD upon its conclusion directs processing from the routine OZM back to the routine SYS as indicated by symbol 278.

Having described how routine OZM1KD (step 274) processes information associated with a newly selected key on keyboard 142, and particularly a key selected to effect the tenths digit 156 in indicator 144 as well the value in a corresponding memory address location, concern now centers on the selection of a second key on the keyboard 142 in order to effect the hundredths ounce digit. In this respect, after the return represented by symbol 278, the routine SYS again calls the routine OZM. Routine OZM eventually checks to see whether another key 170 on the keyboard 142 has been selected. If not, OZM returns processing to the SYS routine as described above. Once a second key associated with the currently selected station has been selected, the routine OZM repeats the steps 256 and 258 to determine whether the selected key is valid, and further sets the flag OZMKDS in accordance with step 260. Further, the routine OZMKED (step 270) is also called.

At this juncture, since a first key of the keyboard 142 has already been selected for the station of interest and since the most recently selected key is the second key of a pair of keys associated with that station, at step 272 the routine OZM determines that the OZIENT flag has already been set (as indeed it was during the previous call to routine OZM1KD (step 274)). Since the OZIENT flag was set, the routine OZM calls routine OZM2KD (step 276) in order to process this second key of the two selected keys, the processing being done in connection with the hundredths ounce digit for the per document weight for the currently selected insert station.

The processing of routine OZM2KD is closely analogous to the processing of OZM1KD but, as described above, concerns the hundredths ounce digit for the selected station rather than the tenths ounce digit. In this respect, like the routine OZM1KD, the routine OZM2KD calls routine OZMOKT to determine which key on the keyboard 142 was actually selected and to determine a two word decimal equivalent of the value represented by the selected key and to put the two word equivalent into RP 8. Further, routine OZM2KD also calls the routine OZMATD which reconstructs the address into which information relative to the tenths ounce digit for the selected station was loaded. This address is returned to the routine OZM2KD in RP 4. However, since the value in RP 8 actually concerns the hundredths ounce value rather than the tenths ounce value, the routine OZM2KD increments the address value in RP 4 so that the numerical value in RP 8 will be loaded into an address indicative of the hundredths ounce value for the selected station. For example, if the third insert station 33 had been selected on the thumbwheel 148, the routine OZMATD would have returned in RP 4 an address corresponding to the location S30ZTN. Routine OZM2KD increments this address by one word so that the address into which the value in RP 4 is loaded is S30ZTN+1=S30ZHU.

Before it completes its processing, the routine OZM2KD clears the OZIENT flag so that upon the next execution step 272 the routine OZM1KD (step 274) will be called rather than the routine OZM2KD. In a similar manner with routine OZM1KD, the routine OZM2KD lastly calls the delay routine UDL and the routine OZMSCD, after which processing is returned to the routine SYS as indicated by symbol 280.

Although the above description of the set-up mode has been described with reference to only one insert station, particularly the second insert station 32, it should be understood that during the set-up mode any one and more than one stations can have their per document weight values changed. In fact, in commencing a new run or batch through the insertion machine, it is quite likely that per document weights for each of the insertion stations will change. In this event, the operator likely rotates the thumbwheel to a new value, and then keys in on the keyboard 142 a new ordered pair representing the tenths ounce and hundredths ounce per document values for each station.

Once set-up of the insertion machine is complete, the operator need only move the switch 150 into the OFF position and then depress the PGM key on the keyboard 142. As a result of these two manual operations, flags are set by the data processor 102 such that the routine OZM cannot again be successfully called by master routine SYS.

ROUTINE TOZ

As seen in FIG. 7, once the set-up mode has been exited (that is, after the return to master routine SYS from the last call to routine OZM), the master routine SYS calls the specialized routine TOZ. The master routine SYS calls the routine TOZ when the flag OZMDE is turned off (reflecting the fact that the switch 150 was just turned off) and the flag OZMDLT (the ounce mode "last time" flag) has not yet been turned off. Routine TOZ essentially transfers data from certain memory locations to other memory locations. In this regard the transfers are as follows:

ENOZTN→ENOTEN
ENOZHU→ENOHUN
HFOZTN→HFOTEN
HFOZHU→HFOHUN
S20ZTN→S20TEN
S20ZHU→S20HUN
S30ZHU→S30TEN
S30ZHU→S30HUN
S40ZTN→S40TEN
S40ZHU→S40HUN
S50ZTN→S50TEN
S50ZHU→S50HUN
S60ZTN→S60TEN
S60ZHU→S60HUN
S702TN→S7TEN
S70ZHU→S7HUN
S80ZTN→S8TEN
S802HU→S8HUN

Upon the conclusion of the data transfers the flag OZMDLT is turned off so that the routine TOZ will not be called again.

ROUTINE KYB

The routine KYB is called by master routine SYS when (1) the PGM key on keyboard 142 has been pressed (so that the PGM key lamp is lit) and (2) the switch 150 is in the "OFF" position. Repeated calls to the routine KYB enable the operator to specify for each of the stations 32–39 whether the station is (1) to feed inserts regardless of indicia markings; (2) to feed inserts depending on the indicia markings; or (3) to be turned off so that no inserts are fed therefrom under any condition.

Once the KYB key has been pressed, the operator presses a numeric key on the keyboard 142 corresponding to a station of interest, and then presses one of three command keys on the keyboard 142 to specify the status of the station whose number was just pressed. The three command keys are the "ON" key (which signifies that the station of interest is to feed inserts regardless of indicia markings); the "SEL" key (which signifies that the station of interest is to selectively feed inserts depending on the indicia markings); and, the "OFF" key (which signifies that the station of interest it to feed no inserts whatsoever). After keys corresponding to the station number and command type have been entered for a first station of interest, a similar doublet of keys can be pressed for another station, and so forth until the PGM key is again pressed (to extinguish the PGM key lamp).

As a result of the operator's entry of commands using the KYB routine, control flags are constructed for each of the stations 32 through 39. Each control flag is a word, the flag for the second station 32 being stored at the location STACN2,; the flag for the third station 33 being stored at the location STACN3, and so forth. If the "ON" key is pressed with respect to any station, the LSB of that station's control flag is set. If the "SEL" key is pressed with respect to any station, the MSB of that station's control flag is set. If the "OFF" key is pressed with respect to any station, a "zero" is loaded into that station's control flag.

CALCULATION MODE

Once programming of the insertion machine has been accomplished using the program mode, and when documents are ready to be fed from the feeder station 31, the insertion machine operation is ready to enter the calculation mode.

As described above, at about machine cycle MC0 the photocell reading means 52 reads the indicia field 50 on the first document 46 fed from the sheet feeder 31 for each machine cycle. The electrical signals provided by the photocell reading means 52 are processed and decoded by the circuit 54 in a conventional manner. The circuit 54 determines from the indicia field 50 which insert stations are to feed documents. Values indicative of such information are supplied on data bus 100 to the data processor 102 which stores the values in appropriate memory locations.

The master routine SYS determines that documents are present at the first station 31 and that the appropriate insert stations along conveyor 20 contain their inserts. Once the routine SYS has processed the mark information read by photocell 52 for a just-fed control document 46 and that information has been decoded by circuit 54, the routine SYS also causes indications of the processed information to be stored at machine cycle MC0 into appropriate memory locations. In this respect, routine SYS sets bits in an array RDHLD to reflect which of the required insert stations are selected according to the indicia 50 on a customer's master control document 46. Routine SYS also sets bits in a word SELSTA to reflect which of the optional insert stations are selected according to the indicia 50 on a customer's master control document 46. In one embodiment the routines are configured with the convention that, should marks be read for stations 36 or 37, bits are set in the word SELSTA since stations 36 and 37 are predesignated as optional insert stations. In another embodiment, the operator can manually enter on the keyboard 142 an indication with respect to each station whether the station is a required insert station (and, hence, if a mark is read the appropriate bit should be set in the array RDHLD) or an optional insert station (and, hence, if a mark is read the appropriate bit should be set in the word SELSTA).

The array RDHLD is a five word array comprising ten 4-bit nibbles. The least significant bit (LSB), also known as the binary 1 bit, of the first nibble of the first word in RDHLD is set if the second station 32 is selected according to indicia 50; the status of the binary 2 bit of the first nibble of the first word reflects whether the third station 33 is selected according to indicia 50; the status of the binary 4 bit of the first nibble of the first word reflects whether the fourth station 34 is selected according to the indicia 50; and, the status of the binary 8 bit of the first nibble of the first word reflects whether the fifth station 35 is selected according to the indicia 50. The binary 1 bit of the second nibble of the first word of RDHLD reflects whether station 6 is selected according to the indicia 50; the binary 2 bit of the second nibble of the first word reflects whether station 7 is selected according to the indicia 50; the binary 4 bit of the second nibble of the first word reflects whether station 8 is selected according to the indicia 50; and, the binary 8 bit of the second nibble of the first word reflects whether station 9 is selected according to the indicia 50.

At machine cycle MC1 is values in RDHLD are moved into identically corresponding positions in a second 5-word array RDHLD1. At machine cycle MC2 the values in RDHLD1 are likewise moved into identically corresponding positions in a third 5-word array RDHLD2. Similar data movements take place with respect to each successive machine cycle so that at any given time each of the stations 32 through 39 have access to the data necessary for the station to perform its function with respect to the customer's documents currently indexed on track 20 before the station.

The binary 1 bit of the first nibble of the word SELSTA reflects whether station 36 was selected; the binary 2 bit of the first nibble of the word SELSTA reflects whether station 37 was selected; the binary 4 bit of the first nibble of the word SELSTA reflects whether station 38 was selected; and, the binary 8 bit of the first nibble of the word SELSTA reflects whether station 39 was selected.

ROUTINE OZC

As seen in FIG. 7, the calculation mode involves a sequence of calls to the routine OZC. There is one call to routine OZC for each customer. Each call to routine OZC occurs just before the machine cycle MC1 for the corresponding customer. As described above, prior to machine cycle MC1 the appropriate bits have been set in the array RDHLD for the customer for whom the call to routine OZC is made.

Figure 4A:
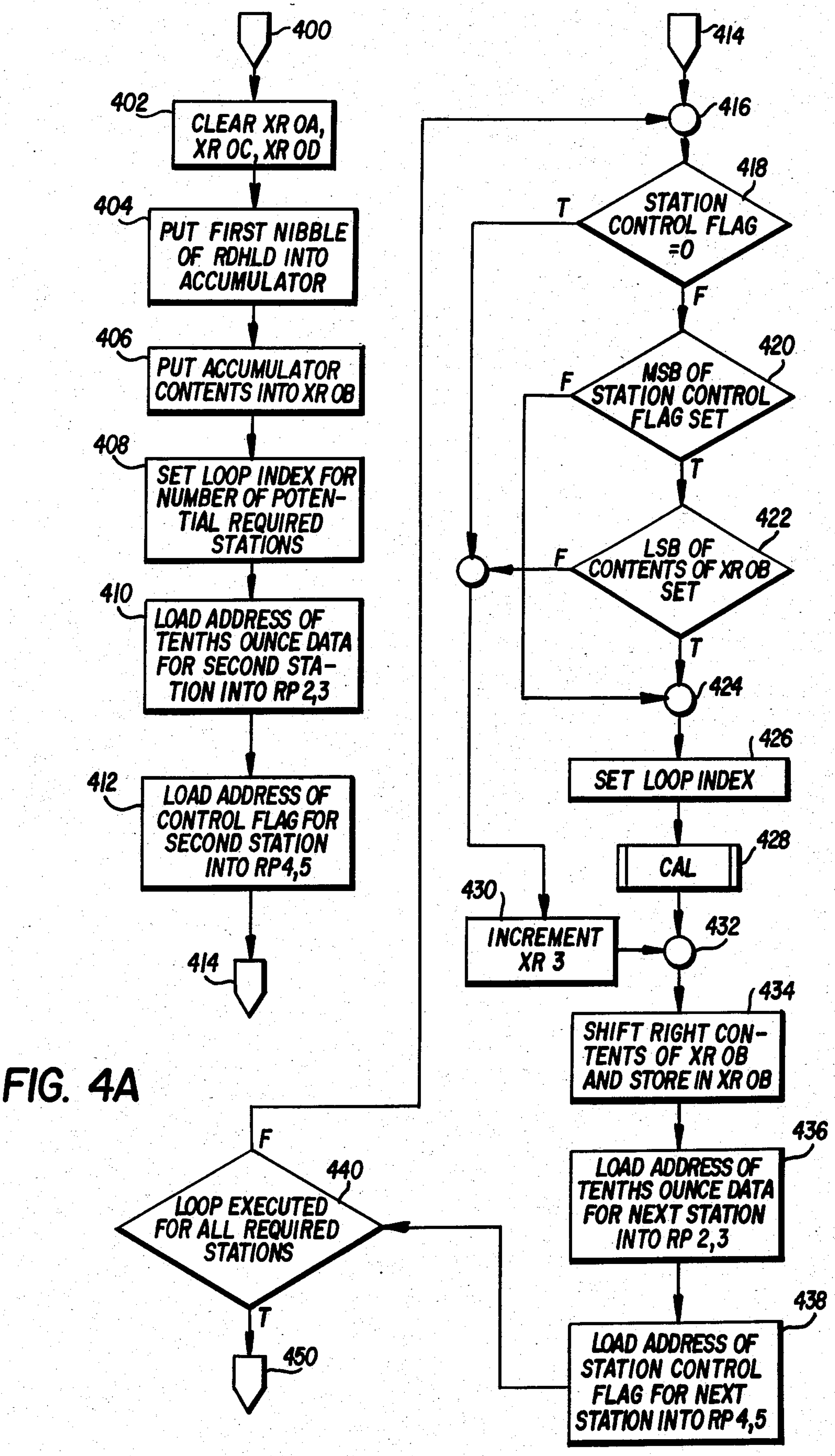
FIGS. 4A, 4B and 4C are diagrams depicting processing steps executed by a specialized routine OZC.

The routine OZC functions to determine the projected total weight of the customer's stuffed envelope. During execution of routine OZC the running units ounce total is maintained in XR OA, the running tenths ounce total is maintained in XR OC, and the running total of the hundredths ounce weight is maintained in XR OD. The processing steps depicted in FIG. 4A illustrate the inclusion of the weights of inserts from selected ones of the insert stations 32–35. The processing steps shown by FIG. 4B reflect the inclusion of the weights of inserts from selected ones of insert stations 36–39. The processing steps in FIG. 4C illustrate the inclusion of the weight of the envelope from the envelope station 42, as well as the inclusion of the weight of the possible plurality of inserts from the fast feeder station 31. As seen hereinafter, routine OZC also calls the selective merchandising routine USM to determine if additional ones of the selected optional insert stations can feed inserts with respect to a customer without the projected weight of the customer's stuffed envelope increasing to an extent to incur additional postage cost. Lastly, routine OZC calls the routine OZS in order to enable activation of either the postage meter 84, the postage meter 88, or the diverter 62.

Upon a call to routine OZC execution jumps to an instruction at location UDPCW as indicated by the symbol 400 in FIG. 4A. Routine OZC then clears index registers OA, OC, and OD (step 402). Then, in preparation for the processing of stations 32–35, the routine OZC puts the first nibble at the location RDHLD into the accumulator (step 404). The accumulator contents are then loaded into the index register OB (step 406). At step 408, a loop index is set for a loop which processes stations 32–35. The loop index corresponds to the number of potential insert stations involved in the processing of the loop. For the embodiment shown in the microfiche appendix, a negative 4 decimal value is loaded into the XR 9 at the loop index. In further preparation for execution of the loop for processing stations 32–35 the tenths ounce data for the second station 32 is loaded into the register pair 2,3 (step 410). As explained above, this address is S20TEN. Then routine OZC loads into the register pair 4,5 the address of the control flag for the second station 32, the control flag being located at the address STACN2 (step 412). Routine OZC is then prepared to execute the loop for processing the weights of inserts which are required to be fed from insert stations 32–35.

The loop for processing insert stations 32–35 begins as indicated at symbol 416 on FIG. 4A. In this loop the routine OZC first checks the station control flag for the station of interest for this execution of the loop to determine if the value at the address of the control flag is zero (step 418). In this regard, during the first execution of the loop commencing at symbol 416 the routine OZC checks the station control flag STACN2 for the second insert station 32, during a second execution of the loop checks the station control flag STACN3 for station 33, and so forth. If the station control flag for the station of interest in not a zero, then routine OZC realizes that the insert station of interest has not been turned off (meaning that the possibility exists that for this customer the customer's indicia 50 may indicate that the insert station of interest is either a required or optional insert station).

In the above regard, if the station of interest has not been turned off, at step 420 the routine OZC then checks to determine whether the MSB of the station control flag has been set. If the MSB of the station control flag has not been set, then routine OZC understands that the insert station of interest is to automatically feed its insert for the customer regardless of what the indicia 50 on the customer's control document 46 may indicate (symbol 424).

If the MSB of the station control flag has been set, then the routine OZC checks at step 422 to determine whether the LSB of the contents of the XR OB has been set. It will be recalled that upon the first execution of the loop commencing at symbol 416 the contents of the XR OB contain the first nibble of the array RDHLD (see steps 404 and 406). Further, the LSB of the first nibble of the array RDHLD provides an indication of whether the insert station of interest for this execution of the loop is to selectively feed an insert for the customer. If the LSB of the first nibble of array RDHLD is set, then the routine OZC realizes that the insert station of interest for this execution of the loop is a required station, and that the weight of an insert at this station must be taken into consideration in projecting the weight of the stuffed envelope for this customer of interest. In order to add the weight of the insert at the station of interest for this execution of the loop, and assuming that only one such insert is to be fed from this station, the routine OZC loads a decimal "−1" into XR 8 to serve as a loop index for an upcoming call to routine CAL (step 426).

With an appropriate loop index loaded into XR 8, the routine CAL is called (step 428). The routine CAL basically adds new tenth ounce data and hundredths ounce data to running totals of units ounce data, tenths ounce data, and hundredths ounce data. In this respect, upon a call to the routine CAL it is expected that the address containing the tenths ounce information for a selected station has been loaded into the register pair 2,3. Knowing that the hundredths ounce information for the station is in the next greater address than the address stored in register pair 2, routine CAL puts the hundredths ounce data into XR 7 after having put the tenth ounce data into XR 6. The routine CAL adds the tenth ounce data stored to a running total of tenths ounce data (stored in XR OC). The routine CAL has a loop therein which adds the XR 6 information to the XR OC total, the loop being executed once for each document fed from the insert station of interest. In this respect, the routine CAL knows how many times to execute the loop inasmuch as index was previously set in XR 8. The processing loop in routine CAL further includes steps wherein the hundredths ounce data in XR 7 is added to a running total of hundredths data in XR OD, this addition also being executed once per loop. In the course of the loop a check is made to determine whether a carry should be made from the hundredths total in XR OD to the tenths total in XR OC, and whether a carry should be made from the tenths total in XR OC to a units total which is maintained in XR OA.

The foregoing basically describes how routine OZC in conjunction with the subroutine CAL adds the weight of an insert at a selected required insert station to a customer's running total weight of his stuffed envelope. It should be mentioned, however, that when the insert station of interest for this particular execution of the loop is turned off (as determined at step 418), or if the LSB for the first word of the array RDHLD indicates that the station has not been selected in accordance with the indicia 50 on the customer's master control document 46, then the weight of an insert from the station of interest is not taken into consideration and accordingly the value in XR 3 must be incremented (step 430) to compensate for not calling the routine CAL, which would have put the address at the hundredths ounce data for the station of interest into register pair 2. Upon either the completion of step 430 or the return from routine CAL (step 428) processing continues at a location represented by symbol 432.

After processing the current station of interest, in this execution of the loop the routine OZC begins to make preparation for the next execution of the loop which is to be undertaken with reference to the next insert station. In this regard, the routine OZC shifts right one bit the contents of XR OB and stores the value of XR OB, so that the LSB of the XR OB now provides an indication of whether the next index station has been selected in accordance with the indicia 50 on the customer's control document 46. For example, upon the first execution of the loop commencing at step 416, step 434 shifts XR OB rightwardly so that the LSB thereof now provides an indication of whether the third insert station 33 has been selected. Further, the routine OZC at step 436 loads the address of the tenth ounce data for the next insert station into RP 2,3. Then the routine OZC loads the address of the station control flag for the next insert station into RP 4,5 (step 438).

Having completed preparations for the next execution of the loop commencing at symbol 416, routine OZC checks to determine whether the loop has been executed for all its associated insert stations (step 440). For the mode shown in the microfiche appendix the check at step 440 basically involves incrementing the XR 9 and determining whether the incremented value of XR 9 yet equals zero. When the contents of XR 9 does equal zero, then routine OZC recognizes that the loop commencing at 416 has been executed for each of the insert stations 32-35 and jumps to the processing steps described with reference to FIG. 4B. If the loop has not yet been executed for each of the insert stations 32-35, processing jumps back to the beginning of the loop as indicated at symbol 416.

In preparation for the processing of stations 36-39, the routine OZC puts the second nibble at the location RDHLD into the accumulator (step 454). The accumulator contents are then loaded into the index register OB (step 456). At step 458, a loop index is set for a loop which processes stations 36-39. The loop index corresponds to the number of potential insert stations involved in the processing of the loop. For the embodiment shown in the microfiche appendix, a negative 4 decimal value is loaded into the XR 9 at the loop index. In further preparation for execution of the loop for processing stations 36-39 the tenths ounce data for the second station 32 is loaded into the register pair 2,3 (step 460). As explained above, this address is S60TEN. Then routine OZC loads into the register pair 4,5 the address of the control flag for the sixth station 36, the control flag being located at the address STACN6 (step 462). Routine OZC is then prepared to execute the loop for processing the weights of inserts which are required to be fed from insert stations 36-39.

Figure 4B:
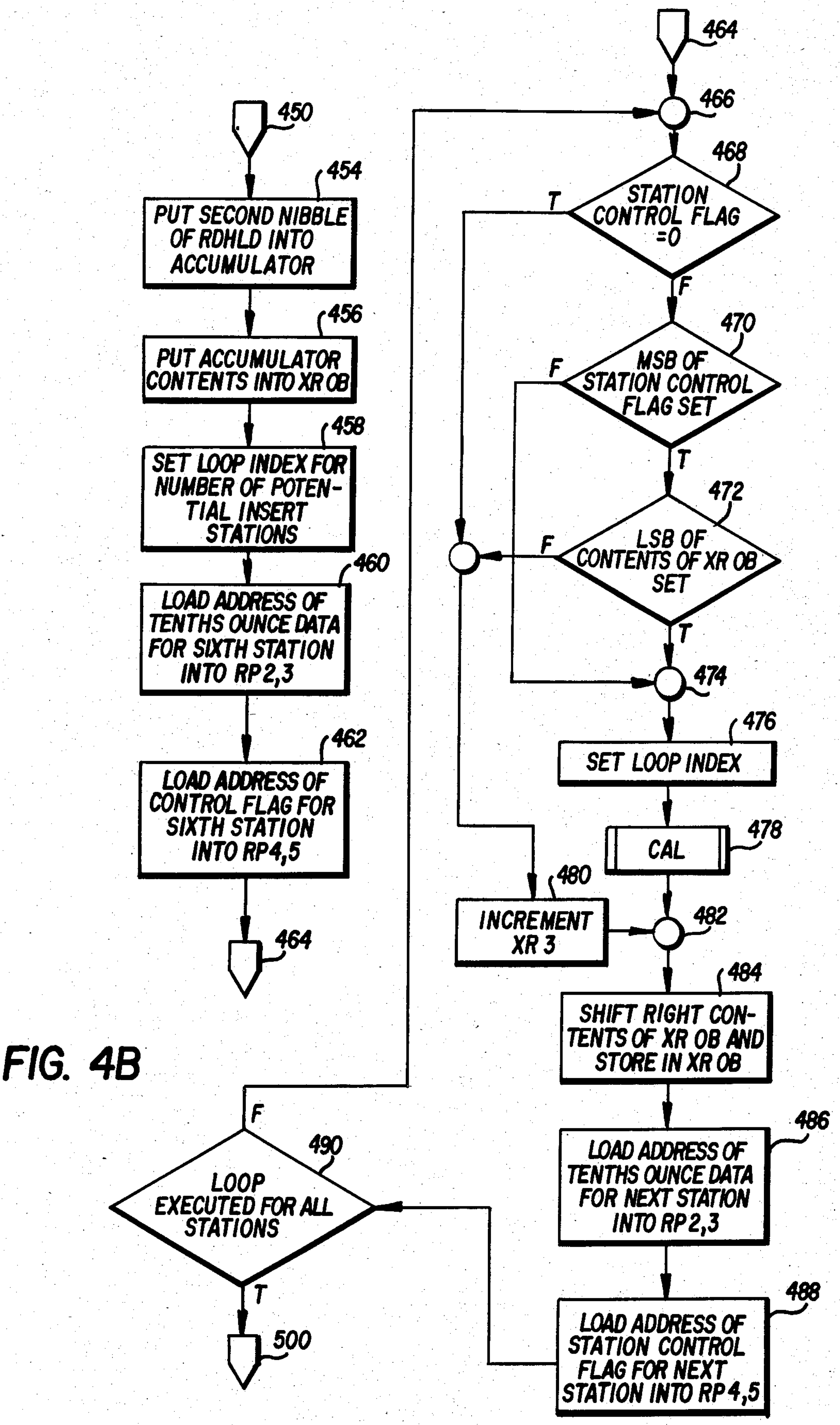
Figure 4C:
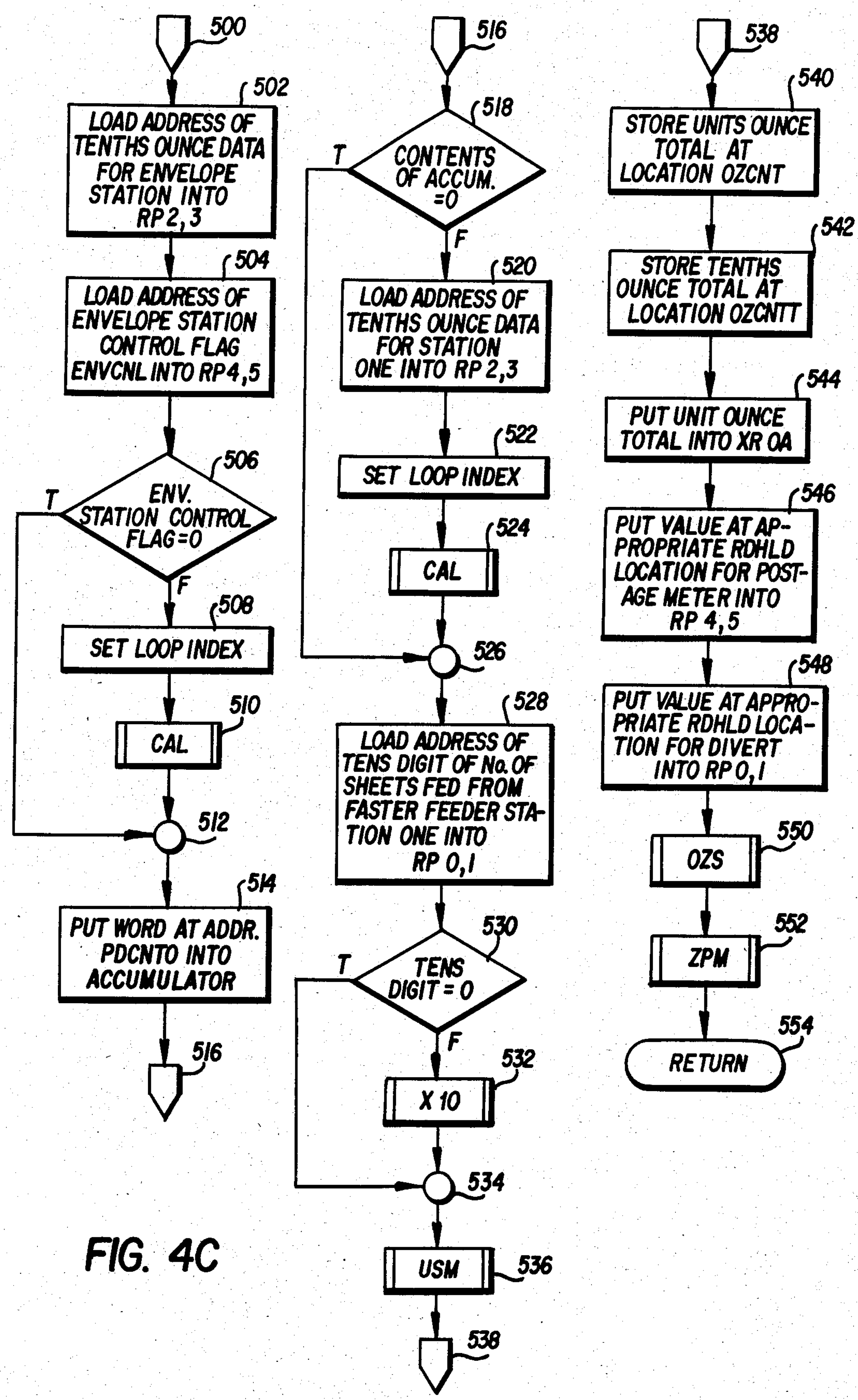

The loop for processing insert station 36-39 begins as indicated at symbol 466 on FIG. 4B. In this loop the routine OZC first checks the station control flag for the station of interest for this execution of the loop to determine if the value at the address of the control flag is zero (step 468). In this regard, during the first execution of the loop commencing at symbol 466 the routine OZC checks the station control flag STACN6 for the third insert station 36, during a second execution of the loop checks the station control flag STACN7 for station 37, and so forth. If the station control flag for the station of interest in not a zero, then routine OZC realizes that the insert station of interest has not been turned off (meaning that the possibility exists that for this customer the customer's indicia 50 may indicate that the insert station of interest is either a required or optional insert station).

In the above regard, if the station of interest has not been turned off, at step 470 the routine OZC then checks to determine whether the MSB of the station control flag has been set. If the MSB of the station control flag has not been set, then routine OZC understands that the insert station of interest is to automatically feed its insert for the customer regardless of what the indicia 50 on the customer's control document 46 may indicate (symbol 474).

If the MSB of the station control flag has been set, then the routine OZC checks at step 472 to determine whether the LSB of the contents of the XR OB has been set. It will be recalled that upon the first execution of the loop commencing at symbol 466 the contents of the XR OB contain the second nibble of the array RDHLD. Further, the LSB of the second nibble of the array RDHLD provides an indication of whether the insert station of interest for this execution of the loop is to selectively feed an insert for the customer. If the LSB of the second nibble of array RDHLD is set, then the routine OZC realizes that the insert station of interest for this execution of the loop is a required station, and that the weight of an insert at this station must be taken into consideration in projecting the weight of the stuffed envelope for this customer of interest. In order to add the weight of the insert at the station of interest for this execution of the loop, and assuming that only one such insert is to be fed from this station, the routine OZC loads a decimal "−1" into XR 8 to serve as a loop index for an upcoming call to routine CAL (step 476).

With an appropriate loop index loaded into XR 8, the routine CAL is called (step 478). The routine CAL basically adds new tenth ounce data and hundredths ounce data to running totals of units ounce data, tenths ounce data, and hundredths ounce data. In this respect, upon a call to the routine CAL it is expected that the address containing the tenths ounce information for a selected station has been loaded into the register pair 2,3. Knowing that the hundredths ounce information for the station is in the next greater address than the address stored in register pair 2, routine CAL puts the hundredths ounce data into XR 7 after having put the tenth ounce data into XR 6. The routine CAL adds the tenth ounce data stored to a running total of tenths ounce data (stored in XR OC). The routine CAL has a loop therein which adds the XR 6 information to the XR OC total, the loop being executed once for each document fed from the insert station of interest. In this respect, the routine CAL knows how many times to execute the loop inasmuch as index was previously set in XR 8. The processing loop in routine CAL further includes steps wherein the hundredths ounce data in XR 7 is added to a running total of hundredths data in XR OD, this addition also being executed once per loop. In the course of the loop a check is made to determine whether a carry should be made from the hundredths total in XR OD to the tenths total in XR OC, and whether a carry should be made from the tenths total in XR OC to a units total which is maintained in XR OA.

The foregoing basically describes how routine OZC in conjunction with the subroutine CAL adds the weight of an insert at a selected required insert station to a customer's running total weight of his stuffed envelope. It should be mentioned, however, that when the insert station of interest for this particular execution is turned off (as determined at step 468), or if the LSB for the first word of the array RDHLD indicates that the station has not been selected in accordance with the indicia 50 on the customer's master control document 46, then the weight of an insert from the station of interest is not taken into consideration and accordingly the value in XR 3 must be incremented (step 480) to compensate for not calling the routine CAL, which would have put the address at the hundredths ounce data for the station of interest into register pair 2. Upon either the completion of step 480 or the return from routine CAl (step 478) processing continues at a location represented by symbol 482.

After processing the current station of interest, in this execution of the loop the routine OZC begins to make preparation for the next execution of the loop which is to be undertaken with reference to the next insert station. In this regard, the routine OZC shifts right one bit the contents of XR OB and stores the value of XR OB, so that the LSB of the XR OB now provides an indication of whether the next index station has been selected in accordance with the indicia 50 on the customer's control document 46. For example, upon the first execution of the loop commencing at step 466, step 484 shifts XR OB rightwardly so that the LSB thereof now provides an indication of whether the seventh insert station 33 has been selected. Further, the routine OZC at step 486 loads the address of the tenth ounce data for the next insert station into RP 2,3. Then the routine OZC loads the address of the station control flag for the next insert station into RP 4,5 (step 488).

Having completed preparations for the next execution of the loop commencing at symbol 466, routine OZC checks to determine whether the loop has been executed for all its associated insert stations (step 490). For the mode shown in the microfiche appendix the check at step 490 basically involves incrementing the XR 9 and determining whether the incremented value of XR 9 yet equals zero. When the contents of XR 9 does equal zero, then routine OZC recognizes that the loop commencing at 466 has been executed for each of the insert stations 36–39 and jumps to the processing steps described with reference to FIG. 4C. If the loop has not yet been executed for each of the insert stations 36–39, processing jumps back to the beginning of the loop as indicated at symbol 466.

The operating steps of FIG. 4C basically concern the envelope station 42 and the fast feeder or first insert station 31. At step 502 the routine OZC loads the address of the tenth ounce data for the envelope station 42 into RP 2,3. At step 504 the routine OZC loads the address of the envelope station control flag ENVCNL into RP 4,5. Routine OZC then checks at step 506 whether the envelope station control flag ENVCNL is zero. If the envelope station control flag ENVCNL is not zero, then at step 508 a "−1" value is loaded into XR 8 to serve as a loop index for an upcoming call to the routine CAL at step 510. The routine CAL functions as hereinbefore described to add the weight of the envelope to the customer's running weight total. If for some reason the envelope station control flag ENVCNL is set equal to zero, then steps 508 and 510 are bypassed and processing continues at a location represented by symbol 512.

Having processed insert stations 32–39 and the envelope station 42, the routine OZC prepares to determine the weight of a possible plurality of number of inserts or sheets which were fed from the fast feeder station 31. The number of inserts fed from the fast feeder station 31 with respect to a customer were determined by the counter photocell 47 used in conjunction with the reading and decoding circuit 54 and the data processor 102. A representation of the number of inserts so fed is stored in memory addresses in the processor 102. In this regard, the routine OZC checks to determine first the units number of such inserts fed from the fast feeder 31 by loading the word at address FDCNTO into the accumulator (step 514). If the word at address FDCNTO does not have a zero value (as determined at step 518), the address of the tenths ounce data for the fast feeder station 31 is loaded into RP 2,3 (step 520). In preparation for a call to routine CAL, the routine OZC puts a value into XR 8 (at step 522) to reflect that the number of executions of an internal CAL loop is to be the units digit indicated by the value at address FDCNTO. A call to routine CAL at step 524 includes in the running projection of the customer's total weight the weight of the number of inserts fed from the fast feeder 31 as reflected by the units digit at address FDCNTO. If, at step 518 it were determined that the contents of the accumulator were zero, then step 520 through 524 would be bypassed and processing continues at a location represented by symbol 526.

Having processed the units digit of the number of sheets fed from the fast feeder 31, the routine OCZ then prepares to process the tens digit of the number of sheets fed from the fast feeder station 31. The address containing the tens digit number value (the address FDCNTO+1) is loaded into RP 0,1 at step 528. At step 530 a check is made to determine whether the tens digit value is zero. If the value of the tens digit is zero, processing jumps to a location represented by symbol 534. If the value of the tens digit is non-zero, then routine OZC calls (at step 532) the routine X10, which, in conjunction with a call to routine CAL by routine X10, includes in the customer's projected total weight the number of inserts indicated by the tens digit of inserts fed from the fast feeder 31.

The routine X10, called at step 532, calls routine CAL which performs in the manner described hereinbefore. Before returning, however, the routine X10 multiplies the values returned from routine CAL by 10. This multiplication is essentially accomplished by algorithm which includes placing the contents of the XR OD (formerly the hundredths ounce total) into register OC and the former contents of XR OC (formerly the tenths ounce total) into XR OA (the units total).

With the routine OZC having included in the customer's running weight total the various possible contributing weights [from insert stations 32–35 (in the loop commencing at symbol 416), from the insert stations 36–39 (in the loop commening at symbol 466), from the envelope station 42, and from the fast feeder station 31], the routine OZC, knowing the projected customer's total weight for all required inserts which must be inserted into a customer's stuffed envelope, calls routine USM at step 536. As described hereinafter, the routine USM essentially determines which of the optional insert stations can feed inserts with respect to a customer's interest without the weight of the customer's stuffed envelope being increased to a greater postage cost classification. To the extent permitted by this criteria the routine USM sets appropriate bits when permitted in the routine RDHLD for the optional stations and adds the weight contributed by the inserts from the optional stations to the running weight totals maintained in XRs OA, OC, and OD.

Upon the return of execution from the routine USM, the routine OZC stores the units ounce total at a location OZCNT (step 540) and the tenths ounce total at a location OZCNTT (step 542). Thereafter the routine OZC puts the units ounce total also into XR OA (step) 544). Routine OZC then determines the appropriate location in array RDHLD which indicates whether one of the postage meters 84 or 88 is to be activated, and puts that location into RP 4,5, (step 546). The location indicative of the status of the first postage meter 84 is determined by a pointer RECP1. The value of the first nibble at address RECP1 indicates which word in the array RDHLD is of interest to the postage meter status; the value of the second nibble at address RECP1 indicates which bit of the word in the array RDHLD is of interest (whether the binary 1 bit, binary 2 bit, and so forth). In the example of the microfiche appendix, the value of pointer RECP1 is preset to hexadecimal 32, meaning that the binary 2 bit of the third word in RDHLD concerns the postage meter 84. By convention the next higher order bit concerns the second postage meter 88 (postage meter 88 has an associated pointer RECP2 preset to hexadecimal 34). Likewise, routine OZC determines what location in the array RDHLD pertains to the activation of the diverter 62 and puts that location into RP 0,1 (step 548). The location for diverter 62 is the binary 1 bit of the third word of RDHLD, as indicated to by pointer RECD1 which is preset to a hexadecimal 31.

Routine OZC then calls routine OZS (step 550). Routine OZS sets a bit in the third word of the array RDHLD to reflect whether the customer's stuffed envelope is to be applied postage by the first postage meter 84 (if the envelope weight is in the 1.00 to 1.99 ounce range); is to be applied postage by the second postage meter 88 (if the envelope weight is in the 0.00 to 0.99 ounce range); or is to be diverted by the diverter 62 (if the envelope weight exceeds 2.00 ounces). In this regard, routine OZS determines if the units ounce total in XR OA exceeds the value at address OZTOP (programmed to be decimal "2") and, if so, sets the binary 1 bit of the third word of array RDHLD to indicate that the diverter 62 is to be activated. If not, routine OZS then determines whether the units ounce total in XR OA exceeds the value at address OZLOW (programmed to be decimal "1") and, if it does, sets the binary 2 bit of the third word of array RDHLD to indicate the first postage meter 84 is to be activated. If not, routine OZS set the binary 4 bit of the third word of array RDHLD to indicate that the second postage meter 88 is to be activated.

Following the call to routine OZS at step 550 the routine OZC calls the routine ZPM (step 552) for zip code processing steps which are not related to the present invention. Routine OZC then returns processing control to the master routine as indicated by symbol 554.

ROUTINE USM

Figure 8:
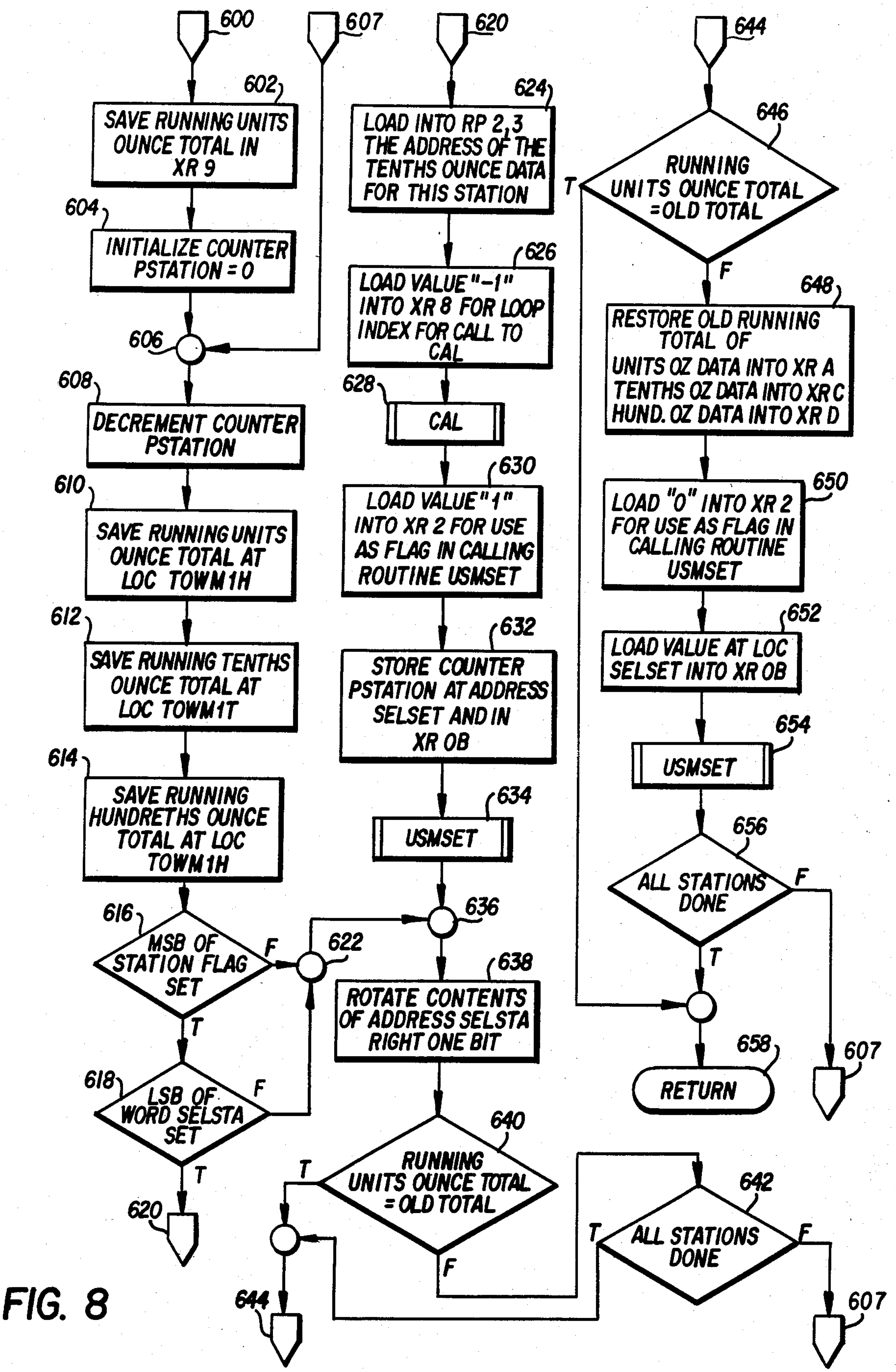

The routine USM is called from routine OZC (at step 536) once per customer and essentially functions to determine whether inserts can be fed from selected optional insert stations without the weight of the additional optionally-fed inserts increasing the weight of the customer's stuffed envelope to an extent that the stuffed envelope incurs additional postage cost over and beyond that necessitated by the inclusion of (1) the selected required inserts, (2) the insert(s) from station 31, and (3) usually the envelope from envelope station 42. A call to routine USM causes execution to transfer to an address at location USM (as indicated by symbol 600 in FIG. 8). The routine USM immediately saves the running units ounce total in the XR 9 (step 602) and initializes the counter PSTATION at a zero value (step 604). For most of the execution of the routine USM the value of address PSTATION, which corresponds to a loop index, is stored in XR 5.

A loop of instructions commencing at symbol 606 is executed for each of the optional insert stations. During processing of the loop the index station of concern for that execution is indicated by the value in XR 5. In this regard, at step 608 the XR 5 value (equivalent to the counter PSTATION) is decremented. Thus, for the first execution of the loop commencing at step 606 the value in XR 5 is "−1". The loop commencing at symbol 606 will be executed a number of times equal to the maximum number of insert stations as reflected by the location PSTMAX. With reference to the illustrated mode of the microfiche appendix, the maximum number of optional insert stations is two, in view of the fact that insert stations 36 and 37 have been programmed to be optional insert stations.

Prior to determining the impact of the addition of the weight of an insert from one of the optional insert stations, the routine USM saves the running units ounce total at a location TOWM1U (step 610); saves the running tenths ounce total at a location TOWM1T (step 612); and, saves the running hundredths ounce total at a location TOWM1H (step 614). Having saved these values the routine USM then checks to determine whether the MSB of the station flag for the station of concern for this execution of the loop has been set (step 616). If the MSB of the station flag has not been set, then routine USM realizes that the insert station of concern was not indicated on the indicia 50 of the customer's control document 46, and therefore is not to be included in the stuffed envelope regardless of what impact it may have on the total weight of the customer's stuffed envelope. For such a case the connector symbols 662 and 636 show that processing jumps to the location represented by symbol 636. If, on the other hand, the MSB of the station control flag has been set, the routine USM then realizes that the insert station of concern is a permitted station and further checks at step 618 whether the LSB of the word SELSTA has been set to indicate that the station of concern for this execution of the loop is a permitted optional station. If the MSB of the station control flag has been set and the LSB of the word SELSTA has also been set, then the routine USM prepares to include on a trial basis the weight of the insert from the insert station of concern for this execution of the loop. Otherwise, the routine USM realizes that no further processing is to occur with respect to this insert station and processing jumps (as indicated by connector symbols 622 and 636) to the location represented by symobl 636.

In its trial determination of whether the weight of the insert station of concern for this execution of the loop 606 can be added to the total weight of the customer's stuffed envelope without incurring additional postage, the routine USM loads into RP 2,3 the address of the tenths ounce data for this station (624). Routine USM, in preparation for a call to the routine CAL, then loads the value "−1" into XR 8 for a loop index call to routine CAL (step 626). Routine CAL is then called at step 628 and functions to determine the total weight of the customer's stuffed envelope with the inclusion of the weight of the insert from the optional insert station of concern. After the return of processing from the routine CAL, the routine USM prepares for a call to routine USMSET by (1') loading the value "1" into XR 2 for use as a flag in caling the routine USMSET (step 630); and, (2) storing the counter PSTATION at an address SELSET and in XR OB (step 632). Then the call is made to routine USMSET (step 634).

When the routine USMSET is called at step 634 and the flag in XR 2 is non-zero, routine USMSET, knowing the current optional station of interest inasmuch as the station number is stored in XR OB, uses table USMSBL to determine the location of a bit in the array RDHLD which pertains to the current station. The appropriate bit in RDHLD is set by this call (step 634) to routine USMSET, but is subject to being cleared if it is eventually determined that the weight of the insert from this optional station is excessive.

In order to prepare for processing the next optional insert station, the routine USM at step 638 rotates the contents of the word SELSTA rightwardly one bit so that the LSB of the word SELSTA now contains an indication of whether the next insert station is a permissable optional insert station.

The routine USM then endeavors to determine whether the added weight of the optional insert station has excessively increased the total weight of the customer's stuffed envelope. This is done at step 640, where a check is made to determine whether the contents of XR OA is still the same as the contents of XR 9. If the contents of XR 9 and XR OA are the same, then the feeding of an insert from the station of concern would not cause the envelope that is eventually stuffed to be so weighty as to fall into the next higher postage cost range and processing continues at the location represented by connector symbol 644. If at step 640 the routine USM determines that the feeding of an insert from the station of concern does incur additional postage cost, the routine USM then determines whether there remain downstream optional insert stations which still may have inserts to add. This is done at step 642 by comparing the values of the counter PSTATION to the value stored at location PSTMAX (i.e. the maximum number of insert stations). If all stations have been processed, routing USM begins to make preparations for a return to its calling routine OZC by continuing processing at the location represented by connector symbol 644. If the value of PSTATION is compared to the value of PSTMAX indicates that further downstream stations remain, then execution jumps back as indicated by connector symbol 607 to the beginning of the loop commencing at location 606.

At step 646 the routine USM again checks whether the running units ounce total is equal to the old ounce total, much in the manner of step 640 as described above. If the running units ounce total does equal the old units ounce total, then routine USM returns to OZC as indicated by symbol 658. If the running units ounce total does not equal the old units ounce total, then the routine USM realizes that the addition of the weight of the insert from the optional insert station caused the customer's total stuffed-envelope weight to jump into the next postal cost range. Therefore, at step 648 the routine USM restores the old running totals (puts the units ounce total into XR A; the tenths ounce data into XR C; and, the hundredths ounce data into XR D). Routine USM then prepares for a further call to routine USMSET in order to clear the bit that was set on a trial basis by the call at step 634. In this regard, at step 650 the routine USM loads a "zero" value into the XR 2 for use as a flag in a second call to routine USMSET. Further, in preparation for the second call of routine USMSET the routine USM loads the value at location SELSET into XR OB (step 652). Then, at step 654, the routine USM calls routine USMSET to clear the bit in array RDHLD previously set by the call at step 634 to the routine USMSET. In the call to routine USMSET at step 654 the flag in XR 2 is zero so that the routine USMSET, knowing the current optional station of interest inasmuch as the station number is stored in XR OB, uses the table USMSBL to determine the location of the bit in the array RDHLD which pertains to the current station of interest. Then routine USMSET clears the bit so that the optional insert station of interest will not be activated for this customer.

Having cleared the bit in array RDHLD by the second call to routine USMSET, the routine USM checks at step 656 to determine whether all the optional insert stations have been processed. This is done by comparing the value of PSTATION (which corresponds to the station of concern) to the value at location PSTMAX. If no further downstream stations remain for processing, execution returns to the routine OZC as indicated by symbol 658. If, on the other hand, the values at locations PSTATION and PSTMAX indicate that further downstream optional insert stations have yet to be processed, routine USM accordingly jumps back (as shown via connector symbol 607) to the beginning of the loop which commences at symbol 606.

From the foregoing description of the operation of the routine USM it should be understood that the routine USM provides the capability of determining which of the optional feed stations are to feed optional inserts so that the greatest number of optional inserts can be fed for the customer of interest. This is done by arranging the optional insert stations so that the weight of the inserts therein are in increasing order. For example, to optimize the number of inserts inserted into a customer's stuffed envelope the lightest weight inserts are placed in the first optional insert station (such as insert station 36), the second lightest weight inserts are placed in the next downstream insert station (such as insert station 37), and so forth.

As indicated above, at each machine cycle each insert station is supplied with sufficient data to advise the insert station whether it is to be activated to feed an insert for the customer whose group of documents is before the station during that machine cycle. The supplied data essentially resembles the data in array RDHLD (it will be recalled that bits were set in the first word of RDHLD to indicate which of the required and optional insert stations were to be activated). If the supplied data so indicates, vacuum means associated with each insert station is enabled to facilitate the feeding of an insert from the station.

As discussed in considerable detail above, some of the insert stations are optional insert stations which house advertising literature and the like for third parties. The sender includes the advertising literature of the third parties in appropriate envelopes mailed to the sender's customers if the inclusion of the advertising literature does not increase the sender's postage cost for each customer. In order that the sender may properly bill the third parties for the sender's services based on the number of pieces of literature actually included with respect to each third party, a count is maintained of the number of inserts fed from each optional insert station. In the illustration provided earlier, the optional inserts for a first third party were loaded into the sixth insert station 36; optional inserts for a second third party were loaded into the seventh insert station 37. The following discussion indicates how counts are maintained of the number of inserts fed from each of the optional insert stations 36 and 37.

When the vacuum means of an optional insert station is activated, the master routine insures that a call is made to a specialized routine SMC. Routine SMC checks to determine if the activated insert station was an optional insert station and, if so, sets an output bit in an appropriate location. If optional insert station 36 was activated, a bit is set in an address ST6CNT. If optional insert station 37 were actuated, a bit is set in an address ST7CNT. The set bit is output through an appropriate output port to a corresponding one-shot device which, upon reception of the output bit, fires a pulse which is incident upon the counter for the optional insert station of concern. With reference to FIG. 3 and using the sixth insert station 36 as an example, setting the bit in address ST6CNT causes a signal on line 56*a* form I/O device 136 to fire one-shot 56. A pulse fired from one-shot 56 increments the digital counter 55 associated with station 36.

With reference to the counters 186 of the embodiment of FIG. 6, at an appropriate point in each machine cycle the one-shot 180 fires a false signal to increment counters 186 for whatever insert stations are feeding inserts during that machine cycle. For example, if counter $186_1$ pertains to insert station 36 while counter $186_2$ pertains to insert station 37, and if both insert stations 36 and 37 have their respective solenoids $192_1$ and $192_2$ activated (as a result of a false signal on respective lines $190_1$ and $190_2$) to feed inserts during a particular machine cycle (station 37 feeding an insert for customer N while station 36 is simultaneously feeding an insert for customer N+1), the counters $186_1$ and $186_2$ are both incremented during the machine cycle to record the feeding of inserts. Thus, each counter 186 is incremented only when both the station vacuum solenoid 192 is activated (as a result of a false signal on line 190) and the terminal of the counter 186 connected to the bus 184 is grounded.

While the invention has been particularly shown and described with reference to the preferred embodiments thereof, it will be understood by those skilled in the art that various alterations in form and detail may be made herein without departing from the spirit and scope of the invention.

The embodiments of the invention in which an exclusive property or privilege is claimed are defined as follows:

1. An insertion machine of the type in which a plurality of feed stations feed items onto an insertion track, said plurality of feed stations including a control feed station from which a master control item is fed onto said track and further feed stations from which items are selectively fed in accordance with indicia on said master control item onto said track for inclusion with a group including said master control item, wherein the improvement comprises:

means for reading said indicia;

means for designating whether at least one of said feed stations is a required feed station from which items must be fed if said indicia so indicates or an optional feed station from which items may conditionally be fed;

means for determining from said indicia on said master control item the particular further feed stations from which items must be fed onto said insertion track for inclusion with said group including said master control item;

data processing means including memory means and arithmetic logic means;

means including said data processing arithmetic logic means for using values indicative of the per item weight of items held in said control feed station and said required feed stations from which it is required that items be fed to obtain a calculated total weight with respect to said group of items;

means for using said calculated total weight to determine a postage category for said group of items; and, means for determining whether optional items from one or more respective optional feed stations can be fed from said optional feed stations and associated with said group of items without changing the postage category determined on the basis of the calculated total weight of said group of items.

2. The insertion machine of claim 1, further comprising:

means for selectively inputting into said data processing memory means with respect to selected stations said values indicative of the per item weight of items held at said stations.

3. The insertion machine of claim 1, further comprising:

means for determining which of said optional feed stations are to feed optional items to be associated with said group of items whereby the greatest number of optional items can be fed with respect to said group.

4. The insertion machine of claim 1, further comprising:

counter means associated with at least one of said optional feed stations for providing an indication of the number of items fed from said optional feed station.

5. A method of operating an insertion machine of the type in which a plurality of feed stations feed items onto an insertion track, said plurality of feed stations including a control feed station from which a master control item is fed onto said track and further feed stations from which items are selectively fed in accordance with indicia on said master control item onto said track for inclusion with a group including said master control item, wherein the improvement comprises:

reading said indicia;

designating whether at least one of said feed stations is a required feed station from which items must be fed if said indicia so indicates or an optional feed station from which items may conditionally be fed;

determining from said indicia on said master control item the particular further feed stations from which required items are to be fed onto said insertion track for inclusion with said group including said master control item;

using values indicative of the per item weight of items held in said control feed station and said feed stations from which it is required that items be fed to obtain a calculated total weight with respect to said group of items;

using said calculated total weight to determine a postage category for said group of items; and determining whether optional items from one or more respective optional feed stations can be fed from said optional feed stations and associated with said group of items without changing the postage category determined on the basis of the calculated total weight of said group of items.

6. The method of claim 5, further comprising the step of selectively inputting into data processing means with respect to selected stations predetermined values indicative of the per item weight of items held at said stations.

7. The method of claim 5, further comprising the steps of:

determining which of said optional feed stations are to feed optional items to be associated with said group of items whereby the greatest number of optional items can be fed with respect to said group.

8. The method of claim 5, further comprising the steps of:

providing an indication of the number of items fed from said optional feed station.

9. The method of claim 5, further comprising the step of:

selectively inputting into said data processing means with respect to a selected station an indication whether the station is to feed inserts regardless of said indicia.

10. The method of claim 5, further comprising the steps of:

selectively inputting into said data processing means with respect to a selected station an indication whether the station is a required insert station or an optional insert station.

11. A machine of the type in which a plurality of feed stations feed items onto an insertion track for inclusion with an associated group of items, wherein the improvement comprises:

means for designating whether at least one of said feed stations is an optional feed station from which items may conditionally be fed;

means for determining which of said feed stations are required feed stations from which items must be fed onto said insertion track for inclusion with said its associated group of items;

data processing means including memory means and arithmetic logic means;

means including said data processing arithmetic logic means for using values indicative of the per item weight of items held in required feed stations to obtain a calculated total weight with respect to said group of items;

means for using said calculated total weight to determine a postage category for said group of items; and, means for determining whether optional items from one or more respective optional feed stations can be fed from said optional feed stations and associated with said group of items without changing the postage category determined on the basis of the calculated total weight of said group of items.

12. The machine of claim 11, further comprising:

means for selectively inputting into said data processing memory means with respect to selected stations said values indicative of the per item weight of items held at said stations.

13. The insertion machine of claim 11, further comprising:

means for determining which of said optional feed stations are to feed optional items to be associated with said group of items whereby the greatest number of optional items can be fed with respect to said group.

14. The insertion machine of claim 11, further comprising:

counter means associated with at least one of said optional feed stations for providing an indication of the number of items fed from said optional feed station.

15. A method of operating a machine of the type in which a plurality of feed stations feed items onto an insertion track for inclusion with an associated group of items, wherein the improvement comprises:

designating whether at least one of said feed stations is an optional feed station from which items may conditionally be fed;

determining which of said feed stations are required feed stations from which required items are to be fed onto said insertion track for inclusion with its associated group of items;

using values indicative of the per item weight of items held in said required feed stations to obtain a calculated total weight with respect to said group of items;

using said calculated total weight to determine a postage category for said group of items; and, determining whether optional items from one or more respective optional feed stations can be fed from said optional feed stations and associated with said group of items without changing the postage category determined on the basis of the calculated total weight of said group of items.

16. The method of claim 15, further comprising the step of selectively inputting into data processing means with respect to selected stations predetermined values indicative of the per item weight of items held at said stations.

17. The method of claim 15, further comprising the steps of:

determining which of said optional feed stations are to feed optional items to be associated with said group of items whereby the greatest number of optional items can be fed with respect to said group.

18. The method of claim 15, further comprising the steps of:

providing an indication of the number of items fed from said optional feed station.

19. The method of claim 15, further comprising the step of:

selectively inputting into said data processing means with respect to a selected station an indication whether the station is to feed inserts regardless of said indicia.

20. The method of claim 15, further comprising the steps of:

selectively inputting into said data processing means with respect to a selected station an indication whether the station is a required insert station or an optional insert station.

* * * * *